(12) United States Patent
VanCamp et al.

(10) Patent No.: US 10,670,372 B2
(45) Date of Patent: Jun. 2, 2020

(54) TARGETING SYSTEM

(71) Applicant: Garmin Switzerland GmbH, Schaffhausen (CH)

(72) Inventors: Chad A. VanCamp, Olathe, OR (US); Robert A. Lewis, Bend, OR (US); Joe Ryan Dejmal, Shawnee, KS (US); Brian F. Ruff, Olathe, KS (US); Jonathan E. Reberry, Overland Park, KS (US); Christopher G. Perra, Kansas City, MO (US)

(73) Assignee: Garmin Switzerland GmbH (CH)

( * ) Notice: Subject to any disclaimer, the term of this patent is extended or adjusted under 35 U.S.C. 154(b) by 382 days.

(21) Appl. No.: 15/615,457

(22) Filed: Jun. 6, 2017

(65) Prior Publication Data

US 2018/0347948 A1    Dec. 6, 2018

(51) Int. Cl.
| | | |
|---|---|---|
| *F41G 1/467* | (2006.01) | |
| *F41G 1/34* | (2006.01) | |
| *G01S 17/88* | (2006.01) | |
| *F41G 3/06* | (2006.01) | |
| *F41G 1/30* | (2006.01) | |

(52) U.S. Cl.
CPC .............. *F41G 1/467* (2013.01); *F41G 1/30* (2013.01); *F41G 1/345* (2013.01); *F41G 3/065* (2013.01); *G01S 17/88* (2013.01)

(58) Field of Classification Search
CPC . F41G 1/467; F41G 1/473; G01C 3/06; G01P 3/66; F41B 5/14
See application file for complete search history.

(56) References Cited

U.S. PATENT DOCUMENTS

| | | |
|---|---|---|
| 3,590,489 A | 7/1971 | Saunders |
| 4,195,414 A | 4/1980 | Robinson |
| 5,090,805 A | 2/1992 | Stawarz |
| 5,425,177 A | 6/1995 | Pacenti |
| 5,634,278 A | 6/1997 | London |

(Continued)

OTHER PUBLICATIONS

Inter Partes Review No. IPR2018-01137 of U.S. Pat. No. 8,316,551, Petition for Inter Partes Review of U.S. Pat. No. 8,316,551B2, May 29, 2018.

(Continued)

*Primary Examiner* — Luke D Ratcliffe
(74) *Attorney, Agent, or Firm* — Samuel M. Korte; Max M. Ali

(57) ABSTRACT

A targeting system operable to be used with a bow to assist an operator with striking a target with an arrow. The targeting system comprising a processor, a target sighting window, a ranging module and a projector. The processor is operable to determine a range (distance) to the target and determine an orientation of the bow to strike the target. The processor is configured to present a first sighting element on the target sighting window and project a second sighting element onto the target sighting window. The projected second sighting element appears to be closer to the target than the first sighting element, which may be aligned with the second sighting element to aim the bow. The projector is also operable to present a variable compensated sighting mark onto the target sighting window that is indicative of a compensated targeting axis.

23 Claims, 10 Drawing Sheets

(56) References Cited

U.S. PATENT DOCUMENTS

| | | | |
|---|---|---|---|
| 5,836,294 | A | 11/1998 | Merritt |
| 5,914,775 | A | 6/1999 | Hargrove et al. |
| 6,073,352 | A | 6/2000 | Zykan et al. |
| 6,079,111 | A | 6/2000 | Williams et al. |
| 6,154,971 | A | 12/2000 | Perkins et al. |
| 6,397,483 | B1 * | 6/2002 | Perkins ................ F41G 1/467 124/87 |
| 6,952,881 | B2 | 10/2005 | McGivern |
| 7,603,804 | B2 | 10/2009 | Zaderey et al. |
| 7,921,570 | B1 | 4/2011 | Pulkrabek et al. |
| 8,316,551 | B2 | 11/2012 | Gorsuch et al. |
| 8,336,216 | B2 | 12/2012 | Samuels et al. |
| 8,508,851 | B2 | 8/2013 | Miao et al. |
| 8,739,419 | B1 | 6/2014 | Pulkrabek et al. |
| 9,494,686 | B2 | 11/2016 | Maryfield et al. |
| 2014/0331985 | A1 * | 11/2014 | Samuels ................ F41G 1/467 124/87 |
| 2015/0377588 | A1 | 12/2015 | Periard et al. |
| 2016/0069640 | A1 | 3/2016 | Pretorius |

OTHER PUBLICATIONS

U.S. Pat. No. 8,316,551, File History dated Nov. 9, 2009 to Nov. 7, 2012.
Inter Partes Review No. IPR2018-01137 of U.S. Pat. No. 8,316,551, Declaration of Dr. Bill Cross, May 29, 2018.
Horace Alfred Ford and W. Butt, The Theory and Practice of Archery, Longman, Greens, and Co. (1887).
Galileo Galilei, Two New Sciences, The MacMillan Company (1914, first published 1638).
Gao Ying, The Way of Archery (first published in 1637), as translated in Jie Tan and Justin Ma, The Way of Archery: A 1637 Chinese Military Training Manual, Schiffer Publishing Ltd. (2014).
Printout from https://www.indiegogo.com/projects/bowranger-bow-hunting-range-finding-sight#/, published prior to Jun. 6, 2017.
Printout from http://www.digi-opto.com/BS.html, published prior to Jun. 6, 2017.
Printout from https://www.leupold.com/rangefinders/hunting-rangefinders/vendetta-2-archery-rangefinder, published prior to Jun. 6, 2017.
Printout from http://www.eotechinc.com/holographic-weapon-sights/model-xps2, published prior to Jun. 6, 2017.
Printout from http://www.eotechinc.com/sites/default/files/manuals/XPS2%20HWS%20user%20Manual%202015%20Rev%20F.pdf, published prior to Jun. 6, 2017.
Printout from http://www.eotechinc.com/holographic-weapon-sights/model-512-xbow, published prior to Jun. 6, 2017.
Printout from http://www.eotechinc.com/sites/default/files/manuals/XBow%20user%20manual%20supplement%20Rev%20F.pdf, published Jun. 2015.
Printout from http://www.eotechinc.com/holographic-weapon-sights/model-512, published prior to Jun. 6, 2017.
Printout from http://www.eotechinc.com/sites/default/files/manuals/512%20HWS%20user%20Manual%202015%20Rev%20F.pdf; published prior to Jun. 6, 2017.
Printout from http://bulletin.accurateshooter.com/2012/08/burris-expands-line-of-eliminator-laser-rangefinding-scopes/, published prior to Jun. 6, 2017.
Printout from https://en.wikipedia.org/wiki/Holographic_weapon_sight, published prior to Jun. 6, 2017.
Printout from https://store.getavyd.com/, published prior to Jun. 6, 2017.

* cited by examiner

TARGETING SYSTEM

BACKGROUND

Conventional projectile weapons, such as a bow and arrow, include or may be used with a ranging module that determines a range (distance) to a target and a sight that aids a user with identifying the target. Some ranging modules rely on a visible light (e.g., a laser) that must be aligned to a point of reference (such as a sight pin while at full draw of the bow) to the target to assist with ranging to the desired or intended target (to inform the operator that a range is being measured for the target). Other ranging modules are coupled with a display (e.g., LCD, heads up display, etc.) that depicts an area associated with an intended target and presents a graphic element (e.g., crosshairs, dot, etc.) that is used to identify the object for which a range is being determined in order to assist a user with ranging to a desired or intended target (instead of other nearby objects).

Some conventional bows include a sight that provides a recommended orientation of the bow to strike the desired target based on a determined range to the desired target, inclination, direction or speed of wind, velocity of an arrow, or various other targeting considerations. For example, the sight may indicate that a bow should be tilted up (pointing above the target) before an arrow is released in order to account for the impact of gravity on the arrow after its release from the bow while it is in flight towards the desired target. Some conventional sights include vertically-aligned pins calibrated for known distances that may be used to aim the bow and arrow to strike a target located at a known distance from the bow and arrow. When a target is determined to be located at a distance that does not correspond to one of the calibrated distances, the operator typically determines a tilt angle applicable to the determined distance based on the available pins that have been calibrated for certain known distances. For instance, a user may use vertically aligned pins calibrated for 20 meters and 40 meters to strike a target located at a range of 30 meters by orienting the bow at a position halfway between the pins corresponding to 20 meters and 40 meters. Removable accessories that determine a range to a desired target may be utilized in combination with one or more pins calibrated for a certain distance to properly aim a bow and arrow to strike a target.

Conventional sights that do not include pins may utilize a group of vertically-aligned light sources (e.g., OLEDs). One of the vertically-aligned light sources may illuminate at a position corresponding to that of each pin calibrated for a known distance. The vertically-aligned light sources may be attached to a material that is transparent or to a material that obstructs the user's view (e.g., along a side surface of a printed circuit board).

SUMMARY

Some embodiments of the invention are directed to a targeting system operable to be used with a bow and arrow, or any projectile weapon, to assist an operator with striking a target with an arrow, or any projectile from a projectile weapon. The targeting system comprises a target sighting window, a projector, a ranging module, a memory, and a processor. The projector is operable to project information onto the target sighting window. The ranging module is operable to output a beam towards the target and receive a reflection of the beam from the target. The target sighting window, which may have at least one partially reflective layer or surface to allow projections to be directed towards the operator, is operable to allow light to pass through such that the operator may observe the target, and includes a fixed sighting mark that is substantially aligned to the ranging module transmit axis.

The processor may be configured to control the projector to project the first sighting element at the first location onto the target sighting window for selecting the target, the first sighting element aligned to the beam, determine a range to the selected target based on a reflected beam from the target, determine an orientation of the bow corresponding to the variable compensated sighting mark that is associated with a change in vertical tilt or a lateral rotation of the bow based at least partially on the determined range to the selected target, determine a second location on the target sighting window to present a compensated sighting mark corresponding to the determined orientation, and control the projector to present the variable compensated sighting mark at the second location on the target sighting window.

This Summary is provided solely to introduce subject matter that is fully described in the Detailed Description and Drawings. Accordingly, the Summary should not be considered to describe essential features nor be used to determine a scope of the claims.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Figure 1:
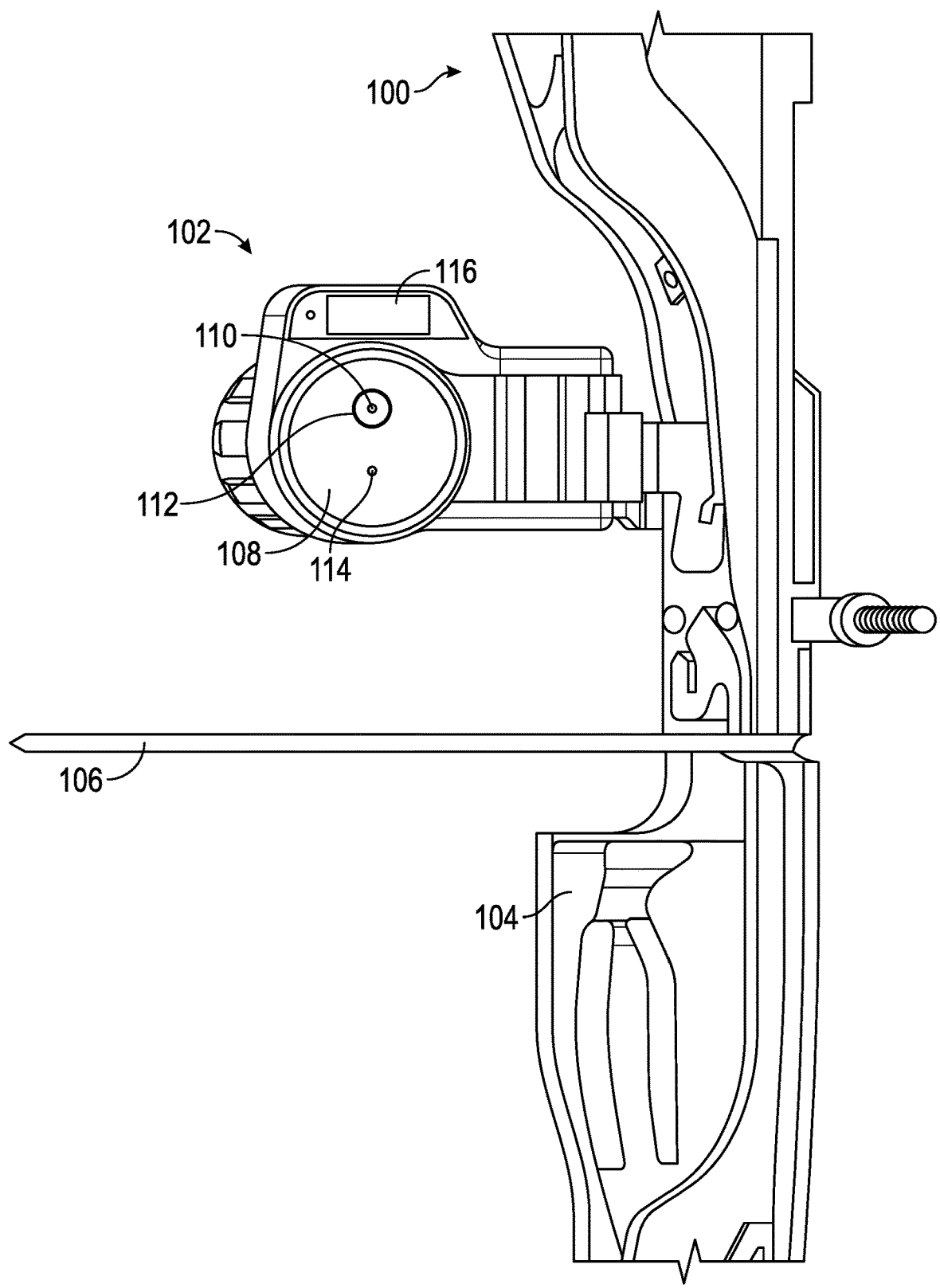
FIG. 1 is a perspective view of a targeting system secured to a bow.

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be appreciated that while the following disclosure refers to bows and other low-velocity projectile weapons, embodiments of the invention may be utilized with other types of weapons. In some exemplary embodiments of the invention, the targeting system interacts with a firearm, a grenade launcher, artillery and other large projectile weapons, a missile, a rocket, a torpedo, or a weapon associated with a vehicle (such as an aircraft, a ship, a tank, an armored personnel carrier, a mobile artillery piece, or the like). It should therefore be noted that throughout the description, "bow" may be replaced by "projectile weapon" or any of the above-mentioned examples; "arrow" may be replaced by "projectile" or any projectile associated with the above-mentioned examples; and "operator" could be replaced with "user," "hunter," "gunner," "shooter," "driver," or the like.

Various bows utilize sights to assist an operator with aligning the bow to aim an arrow at a target and strike the target with the arrow. For ranging a target, an illuminated display surface may present or project a dot for use with ranging to the target, but the projection may appear to move as the frame-of-reference changes because the beam may be projected relative to the frame of reference of the sight assembly. Small movements of the bow in elevation or azimuth angles may cause the sighting point of the ranging module to shift substantially.

Many conventional bows include a peep sight that is attached to or incorporated within bow string to aim at a target using a pin or LED in a target sighting window of a conventional scope attached to the bow. The peep sight typically forms a small, circular opening through which a target sighting window, which includes a calibrated pin or LED, and a target scene is viewed by the user. The typical location of the peep sight on the bow string requires the bow to be fully drawn (the bow string is pulled by the user to an anchor point in the fully drawn position) and thus limits its use to that position. As a result, use of a conventional peep sight establishes an aiming sight line (a line of sight) extending through the peep sight and the conventional target sighting window to align a target with a pin or LED in the target sighting window when viewed from a user's eye position. Although the peep sight may be positioned close to the user's eye, even slight movement or rotation of the user in the fully drawn position may cause misalignment of the bow and result in errant ranging or shot of the arrow.

Similarly, many conventional rifles integrate on a top surface of the rifle a front sight and a rear sight, both of which are aligned by the user when aiming the rifle at a desired target. Typically, one of the rifle sights is a vertical post and the other rifle sight is shaped such that it has a central U-shaped or V-shaped opening through which the user looks to align the rifle properly to strike a desired target. The two sights on a top surface of a conventional rifle, or any projectile weapon, enable a user to properly orient the rifle because the sight points serve as two points that align the user's aiming sight line to the barrel of the rifle. Some conventional rifle sights include a projector engine operable to output a holographic image that projects one or more sighting elements onto a surface viewed by a user such that the projected elements appear to be located closer to a target (i.e., the projected sighting elements are projected onto a target plane) when the surface is viewed from a perspective corresponding to a user's eye position.

To aid with properly aiming at a target for determining a range to the target, some conventional targeting systems include a target sighting window including a reticle or a ranging module including a laser diode operable to output a visible light (e.g., a laser) on a desired target. For targeting systems that provide information relating to a recommended orientation (e.g., vertical or lateral angular adjustment), it is important that a range is being accurately measured for the desired target instead of a nearby object. Embodiments of the present invention enable precise ranging to such a target using a combination of a laser sighting reticle and a fixed sighting mark presented within a sight without requiring use of a peep sight located on a bow string or a laser diode that outputs a visible light on the target.

An arrow's velocity may be impacted by its characteristics, a full bow draw distance, and type of string release mechanism. Arrows vary by weight, length, as well as various other characteristics. The Earth's gravitational pull causes an arrow to drop after its release while it travels to a target. When aiming for a target, it is well-known for a user (operator) to account for the gravitational pull of the Earth based on a distance to the target and then utilize one or more pins calibrated for various distances to successfully strike a target with the arrow.

Additionally, conventional bow sights enable an operator to align, before an arrow is released, one of a plurality of vertically-aligned pins, each of which is calibrated for a known distance, with a desired target based on a distance to the target. For instance, five vertically-aligned pins within a conventional scope may calibrated for distances of 10 yards, 20 yards, 30 yards, 40 yards, and 50 yards for a particular type of arrow. Calibration of the pins to correspond to each the desired calibration distances may include adjusting a vertical position of each pin and/or a position of the scope including the pins on the bow. Once a distance to a target is known, the user of a conventional scope may utilize one or more of the calibrated pins to aim at and strike a target. Therefore, determining an accurate range (distance) to a desired target can assist the operator with successfully striking the target.

For example, an operator may use a pin calibrated for 20 meters to strike a target located 20 meters away from the bow by aligning the target with the calibrated pin. When a desired target is located at a distance that does not correspond to one or a plurality of pins calibrated for predetermined distances, an operator typically determines a tilt angle of the bow based on the available pins, each calibrated for a predetermined distance. For instance, an operator may use vertically-aligned pins calibrated for predetermined distances of 20 meters and 40 meters to strike a target located at a range of 30 meters by orienting the bow such that the target is positioned halfway between the two pins calibrated for the predetermined distances of 20 meters and 40 meters, respectively.

The targeting system disclosed herein implements features and techniques to aid a user align his aiming sight line to a path of a ranging module beam and adjust an orientation of the bow to successfully strike a target with an arrow. The targeting system may use a distance to the target to determine and present information on a target sighting window relating to an orientation of the bow and arrow. For instance, the presented information may include a variable compensated sighting mark determined based on a determined range to the target, arrow characteristics (e.g., arrow weight, length, velocity, etc.), an inclination of the bow or operator, a direction or speed of wind, or other criteria. Thus, embodiments of the targeting system aid an operator with accurately aiming the bow and arrow towards a target using a target sighting window, accurately ranging (determining a distance to) the target, and determining an orientation of the bow based on a compensated sighting mark presented on the target sighting window.

The targeting system may present in the target sighting window two sighting elements that are utilized to align his aiming sight line to a path of a ranging module beam. The two sighting elements are presented such that one sighting element appears closer to the target than the other sighting element when the target window is viewed from a perspective corresponding to a user's eye position. A user may utilize the two sighting elements to align the bow and arrow to correspond to a location at which a ranging module is directed. In embodiments, a ranging module beam is output from a location of the targeting system that is one or two inches adjacent to the center of the target sighting window. For example, the sighting elements may be presented on one transparent surface such that a first sighting element is positioned or presented on the surface and a second sighting element is projected onto the same surface, where the projected second sighting element appears to be closer to the target than the first sighting element when the target window is viewed from a perspective corresponding to a user's eye position. Alternatively, the sighting elements may be presented on parallel, transparent surfaces such that a first sighting element is positioned or presented on a first surface and a second sighting element is positioned or presented on a second surface, where the second surface is closer to the target than the first surface when the surfaces are viewed from a perspective corresponding to a user's eye position.

In embodiments, a processor of the targeting system may be configured to present a first sighting element (a fixed sighting mark) on a target sighting window and control a projector to present a second sighting element (a laser sighting reticle) onto the target sighting window. In embodiments, the first sighting element (the fixed sighting mark) is permanently affixed to a surface of the target sighting window such that it is visible at all times. As detailed below, the combination of the fixed sighting mark and the projected laser sighting reticle on the target sighting window provide two points along a user's aiming sight line that aids with aligning his aiming sight line to a path of a ranging module beam and properly orienting the targeting system for ranging to a desired target. When the combination of sighting marks presented in the target sighting window are combined with a peep sight, the user has three sighting references to accurately aim the bow and arrow to the target, thus improving the user's aim. However, a peep sight is not required to align the bow to with the user's aiming sight line towards the desired target because the combination of the fixed sighting mark and the projected laser sighting reticle (both sighting marks presented on the target sighting window) provide two points a user needs to properly ensure orientation of the targeting system to align with the path of the ranging module beam. The two sighting marks are fixed relative to each other and enable a user to aim at a target desired to be ranged without requiring the bow string to be fully drawn to bring a peep sight into a position at which it may be viewed through from a user's eye position. Thus, in embodiments of the targeting system including a peep sight for use when the bow string is fully drawn, the user has three sight points for reference when aiming at a target (if the peep sight is aligned to the line of sight corresponding to the sighting marks presented on the target sighting window for a predetermined distance, such as 20 yards). As discussed below, the bow string is drawn by the user to bring the peep sight near the user's eye position and used for alignment with a variable compensated sighting mark presented in the target sighting window when the user is ready to release the arrow from the bow towards the target.

The targeting system may also include a plurality of vertically-aligned light sources presented on or projected onto a surface of the target sighting window for use after a desired target has been ranged. Specifically, after a desired target has been ranged (i.e., a distance from the bow and arrow to the target has been determined), the processor may be further configured to present on the target sighting window a variable sighting mark indicative of a compensated targeting mark. The vertically-aligned light sources are substantially continuous such that any point along a center vertical line extending between the top and bottom of the target sighting window may be illuminated by the processor and the position of the compensated targeting mark on the target sighting window is determined at least in part based upon a range determined by the ranging module to a target. For instance, the targeting system processor may utilize a distance, as well other criteria, to a target to determine a location (point) along the vertical line at which the user should aim to strike the target and then control the corresponding light source to be illuminated.

Similar to the fixed sighting mark, the vertically-aligned light sources may be positioned or presented on the target sighting window. One of the vertically-aligned light sources is illuminated by the processor to present the variable compensated sighting mark. For instance, the light sources may be OLED light sources mounted to a transparent strip affixed to a target sighting window. Alternatively, the light sources may be located in a housing of the target sighting system and reflected onto a reflective side of the target sighting window.

An operator may use the targeting system in a variety of manners. For instance, an operator positioned at a location that is level with (having similar elevation to) a location of a desired target may use the combination of the laser sighting reticle and the fixed sighting mark presented on the target sighting window to aim the ranging module at a target, provide a user input to cause a processor of the targeting system to determine a range (distance) to the desired target, determine an orientation of the bow and arrow based on the determined range (distance), and then present on the target sighting window a variable compensated sighting mark, which the user uses to aim for the desired target before an arrow is released.

For the ranging step, a ranging module of the targeting system determines a distance to a target once the operator has oriented the bow and ranging module to aim towards a desired target such that a beam of the ranging module may be output from the ranging module and reflect to the ranging module. The ranging module beam is output from a predetermined position relative to the target sighting window (e.g., one or two inches adjacent to the center of the target sighting window). The combination of the fixed sighting mark and the projected laser sighting reticle on the target sighting window provide two points along which to align a user's aiming sight line to the path of a ranging module beam. The target sighting window of the targeting system may present a fixed sighting mark and a laser sighting reticle to enable an operator to aim the bow and ranging module towards the target by orienting the bow and ranging module to a desired target such that the ranging module may accurately determine a range to the desired target. Because the fixed sighting mark and laser sighting reticle align only when the bow and ranging module is properly aimed at a target, the operator may utilize both sighting marks to aim at a desired target to which the ranging module may determine a range. Such use of two sighting marks presented in the target sighting window does not require aligning a peep sight with the user's eye, which typically requires fully drawing a bow string to an anchor, and thereby avoids inadvertently determining a range to an object other than the desired target. The processor may determine a distance to the target based on the duration of time that passed for the beam to travel to the target and reflect back to the ranging module.

In embodiments, the targeting system may include a depressible trigger (e.g., a button, switch, etc.) for the processor to receive user input that the bow has been oriented to aim towards a desired target and is ready for ranging. For instance, the targeting system may be configured such that the user engages and holds the trigger during the aiming process and then releases the trigger once the bow has been oriented towards a target (providing an input to the processor to determine a distance to the target). Alternatively, the targeting system may be configured such that the user does not engage the trigger during the aiming process and then engages the trigger once the bow has been oriented towards a target to determine a distance to the target.

The processor may determine an angle at which the bow and arrow should be tilted vertically (up or down), rotated laterally (left or right), or any combination thereof, based at least partially on the determined range (distance) to the target and present on the target sighting window a variable compensated sighting mark, which the user aligns with the desired target before an arrow is released. The user orients the bow and arrow to the determined angle by aligning the variable compensated sighting mark with the target. The processor may determine a location on the target sighting window onto which the variable sighting mark is presented and control a corresponding light source to be illuminated. The processor may utilize the determined range to the target, an inclination, a sensed direction or speed of wind, a stored velocity of an arrow, or any combination thereof, to determine the location of the variable sighting mark that is presented on the target sighting window. The operator may align the variable sighting mark with the desired target before releasing an arrow with which the operator desires to strike the target. As a result, a user may utilize the variable sighting mark to orient the bow vertically (up or down), laterally (to left or right side), or any combination thereof, to strike the target.

Thus, the targeting system ensures that elements of a target sighting window and a beam of a ranging module properly align to aim at a common target for accurate ranging to the target. The targeting system utilizes the range (distance) to provide a compensated sighting mark in the target sighting window to aid a user with adjusting his aim towards the target before an arrow is released. A discrepancy between the ranging step and orienting the bow and based on the determined range may cause the arrow to miss the desired target.

Embodiments of the invention may be used in an environment of a bow 100. Bow 100 may be a straight bow, a recurve bow, or a compound bow. Alternatively, bow 100 may be a cross-bow, a firearm, or the like. As illustrated in FIG. 1, in some embodiments, bow 100 may be a compound bow. FIG. 1 shows a bow 100 with a targeting system 102 thereon, as seen from an operator's perspective (with a target positioned on the opposite side of bow 100 and targeting system 102).

The targeting system 102 may be mounted to the bow 100 above an arrow rest 104 and arrow 106. Targeting system 102 contains a transparent or semi-transparent target sighting window 108. An object to be targeted using targeting system 102 is seen by a user through target sighting window 108. The target sighting window 108 enables a processor of targeting system 102 to present or display one or more sighting marks (such as a fixed sighting mark 110, a laser sighting reticle 112, and a variable compensated sighting mark 114, each of which is discussed in depth below) used for calibration of targeting system 102 and the targeting of an object of interest. The processing system may calibrate the targeting system 102 and determine an orientation of the bow to strike a target with an arrow based on a determined range to the object and information from sensors (e.g., an inclinometer, a gyroscope, etc.). The targeting system 102 includes a laser ranging module 500. In embodiments, the targeting system 102 may further include an alphanumeric display 116 for the display of information to the operator, as discussed below.

The target sighting window 108 is substantially transparent, with a reflective layer such that it is operable to allow light to pass through to observe the target 218 and to direct a targeting projection to the operator. As discussed more below, the surface of the target sighting window 108 may be partially reflective (for example, within a range of 10-50%), polarized, and/or may incorporate a narrow-band reflectivity to enhance the visibility of the various projected reticles. The projector is operable to project onto the target sighting window 108 a fixed sighting mark 110 and/or a laser sighting reticle 112 that substantially aligns line of sight 208 to the ranging module transmit axis 212. The projector is further operable to project a variable compensated sighting mark 114 onto the target sighting window 108. The variable compensated sighting mark 114 is associated with a compensated targeting axis 210, which is determined at least in part based upon the range indication. In embodiments, the color of the variable compensated sighting mark 114 may be the same color as the fixed sighting mark 110 or the variable compensated sighting mark 114 may be a different color to increase visibility of the variable compensated sighting mark 114.

Targeting system 102 may include, in embodiments, a projector housing 406 enclosing a processor, a memory, a ranging module 500, an inclinometer, an accelerometer, a battery, and other components.

Figure 11:
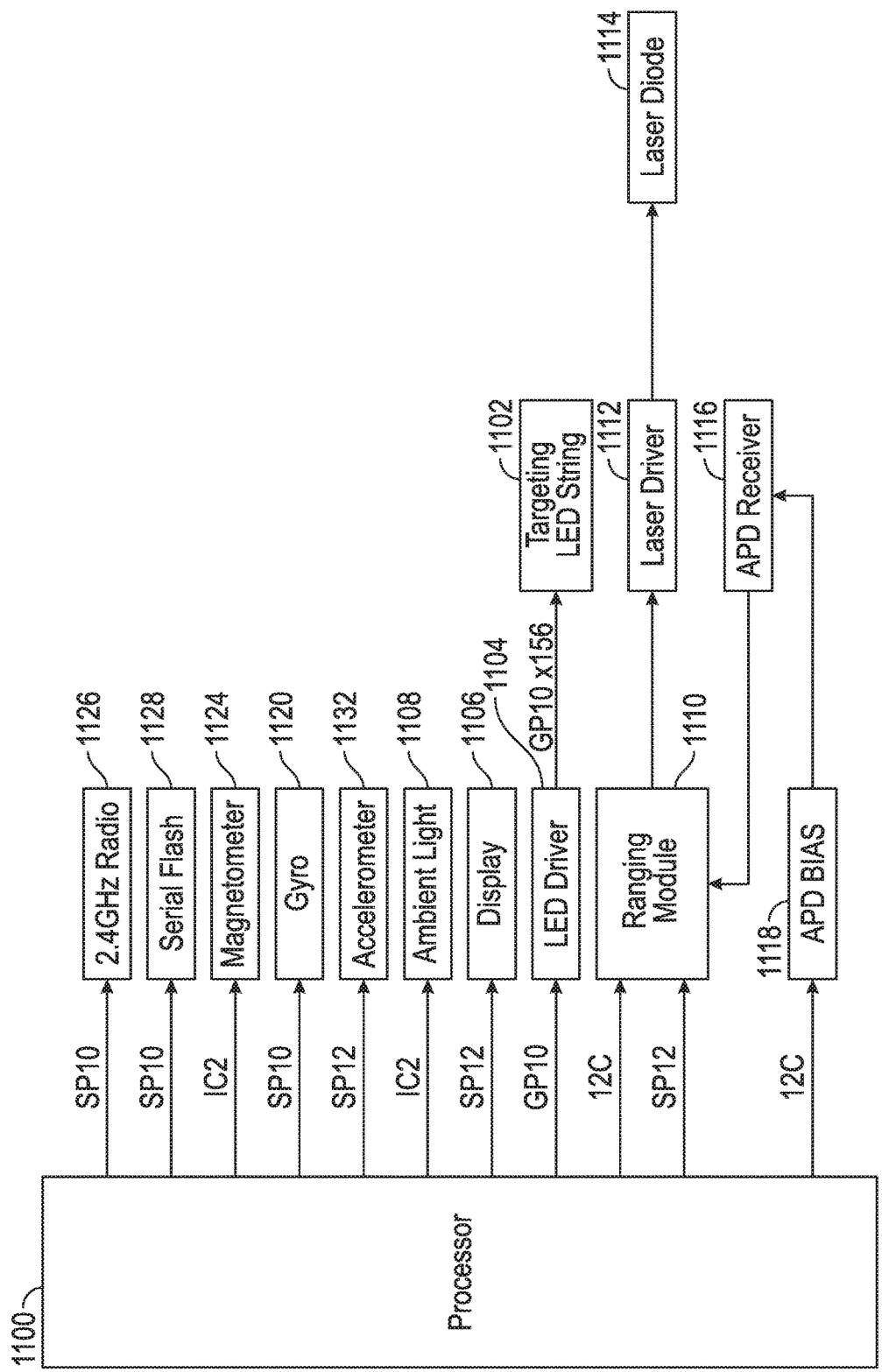
FIG. 11 is a block hardware diagram illustrating exemplary electronic components of the targeting system.

The targeting system 102 may include a processor (which may be the microcontroller illustrated in FIG. 11). The processor provides processing functionality for the targeting system 102 and may include any number of processors, micro-controllers, or other processing systems, and resident or external memory for storing data and other information accessed or generated by the targeting system 102. To provide examples, the processor may be implemented as an application specific integrated circuit (ASIC), an embedded processor, a central processing unit associated with targeting system 102, etc. The processor may execute one or more software programs that implement the techniques and modules described herein. The processor is not limited by the materials from which it is formed or the processing mechanisms employed therein and, as such, may be implemented via semiconductor(s) and/or transistors (e.g., electronic integrated circuits (ICs)), and so forth.

It is to be understood that the processor of targeting system 102 may be implemented as any suitable type and/or number of processors. For example, the processor may be a host processor of targeting system 102 that executes functions and methods relating to the information presented on target sighting window 108 as well as functions and methods relating to ranging module 500. It should also be appreciated that the discussed functions and methods performed by the processor of the targeting system 102 may be performed by the processor of the ranging module 500. In embodiments, ranging module 500 includes a separate processor and the described structure of the processor may also describe corresponding structure on the processor of the ranging module 500.

The targeting system may also include a communications element (not illustrated) that permits the targeting system 102 to send and receive data between different devices (e.g., the ranging module 500, the inclinometer, other components, peripherals, and other external systems) and/or over the one or more networks. The communications element includes one or more Network Interface Units. NIU may be any form of wired or wireless network transceiver known in the art, including but not limited to networks configured for communications. Wired communications are also contemplated such as through universal serial bus (USB), Ethernet, serial connections, and so forth. Targeting system 102 may include multiple NIUs for connecting to different networks or a single NIU that can connect to each necessary network.

The targeting system 102 may also include a memory (not illustrated). The memory is an example of device-readable storage media that provides storage functionality to store various data associated with the operation of the targeting system 102, such as the software program and code segments discussed below, or other data to instruct the processor and other elements of the targeting system 102 to perform the techniques described herein. A wide variety of types and combinations of memory may be employed. The memory may be integral with the processor, a stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the targeting system 102, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The targeting system 102 may also comprise an inclinometer operable to determine an inclination of a ranging module transmit axis 212 relative to horizontal (e.g., relative to an artificial horizon). The compensated targeting axis 210 is determined at least in part by a horizontal component to the range indication. As the target 218 may be above or below targeting system 102 and its ranging module 500, the range indication can be expressed as a vertical component and a horizontal component (being the vertical and horizontal sides of a right triangle, with a line from the ranging module 500 to the target 218 being the hypotenuse). As the force of gravity affects travel in the horizontal direction, only the horizontal component (or some associated ratio) may be used in calculating the compensated targeting axis 210.

The targeting system 102 may also comprise an accelerometer (illustrated schematically in FIG. 11) operable to detect a shot from the bow 100. The accelerometer detects accelerations or other motion of the targeting system 102. If the detected acceleration is above a certain threshold, the accelerometer (or the processor) may process a shot. The determination that the operator has shot the bow 100 may then be used for various purposes. For example, during the calibration process the processor may prompt the user, via the alphanumeric display 116, to input whether the arrow 106 struck the target 218 and/or any targeting error between the sighted point and the impact point. As another example, following the calibration process, the processor may instruct the projector 600 to turn off the variable sighting mark 114.

The targeting system 102 may also comprise an ambient light sensor (illustrated schematically in FIG. 11) operable to detect an ambient light level at the bow 100. A characteristic of the variable compensated sighting mark 114 is determined by the ambient light level (or more specifically, determined by an ambient light reading from the ambient light sensor). Characteristics of the variable compensated sighting mark 114 that may change include a brightness level, a color, a shape or a size, or other visual characteristic. The characteristic is changed such that the operator can still see the variable compensated sighting mark 114 as well as the target 218 without the variable sighting mark 114 being too obtrusive. For example, in low light scenarios, a smaller and/or dimmer variable sighting mark 114 will allow the operator to observe both the variable sighting mark 114 and the target 218. The variable sighting mark 114 may also be in the red spectrum so as to reduce night blindness in the operator. In brightly lit scenarios, a larger and/or brighter variable sighting mark 114 may be used to ensure that the operator can see the variable sighting mark 114. In embodiments of the invention, the changing of the characteristic is performed without operator input (e.g., the processor selects the characteristics of the variable sighting mark 114 without prompting the operator). The operator may additionally or alternatively be provided with a selection for the variable sighting mark 114 (for example, the operator may indicate that a brighter variable sighting mark 114 is generally desired by the operator, or that the operator prefers the variable sighting mark 114 to be a certain color).

Figure 7:
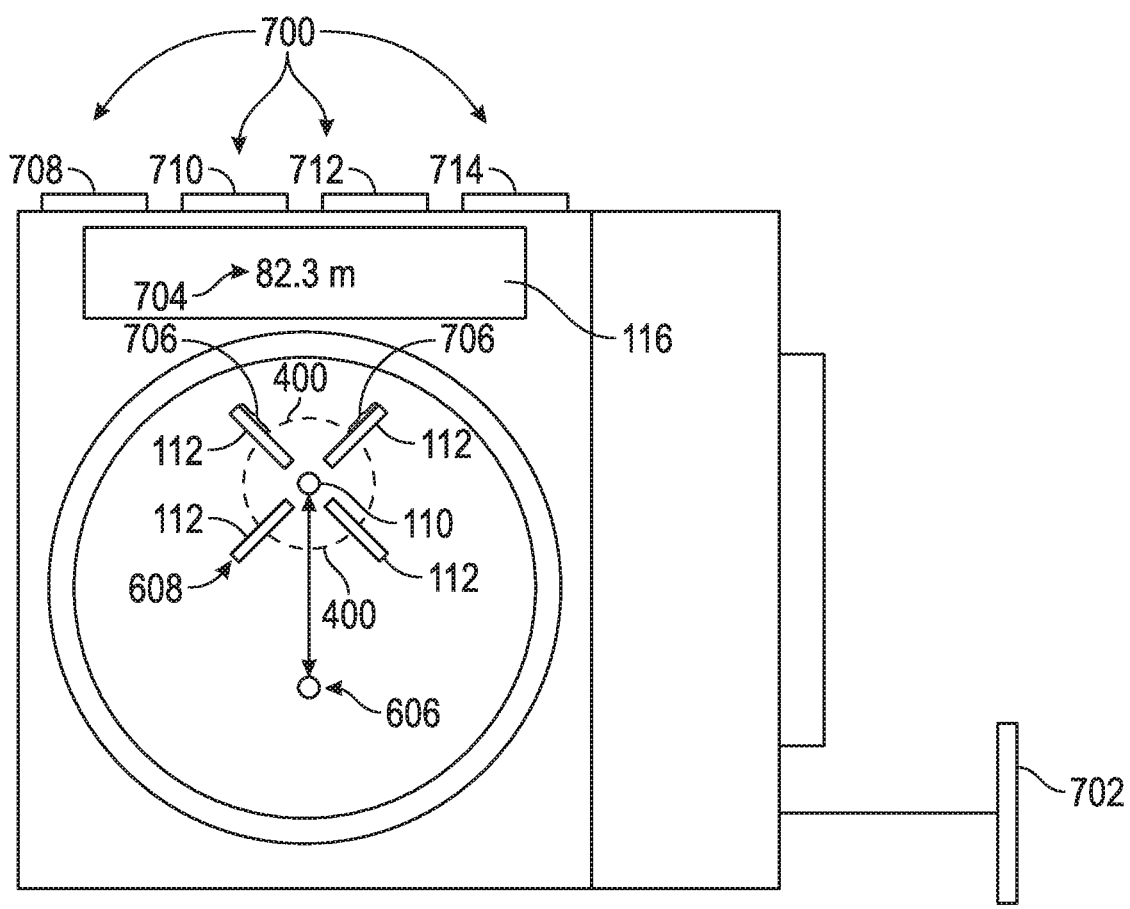
FIG. 7 is a simplified rear view of the targeting system, illustrating the various sighting marks that may be displayed thereon.

In embodiments of the invention, the targeting system 102 includes an alphanumeric display 116 to present information to the operator (as illustrated in FIG. 7). In embodiments, the alphanumeric display 116 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light-Emitting Diode), and so forth, configured to display text and/or graphical information such as a graphical user interface. The alphanumeric display 116 could also be a three-dimensional display, such as a holographic or semi-holographic display. The alphanumeric display 116 may be backlit via a backlight such that it may be viewed in the dark or other low-light environments, as well as in bright sunlight conditions.

The alphanumeric display 116 may be provided with a screen for presentation of information and entry of data and commands. In one or more implementations, the screen comprises a touch screen. For example, the touch screen may be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens may include surface capacitance touch screens, projected capacitance touch screens, mutual capacitance touch screens, and self-capacitance touch screens. The alphanumeric display 116 may therefore present an interactive portion (e.g., a "soft" keyboard, buttons, etc.) on the touch screen. In some embodiments, the alphanumeric display 116 may also include physical buttons integrated as part of targeting system 102 that may have dedicated and/or multi-purpose functionality, etc. In other embodiments, the alphanumeric display 116 includes a cursor control device (CCD)

that utilizes a mouse, rollerball, trackpad, joystick, buttons, or the like to control and interact with the alphanumeric display 116.

Figure 2:
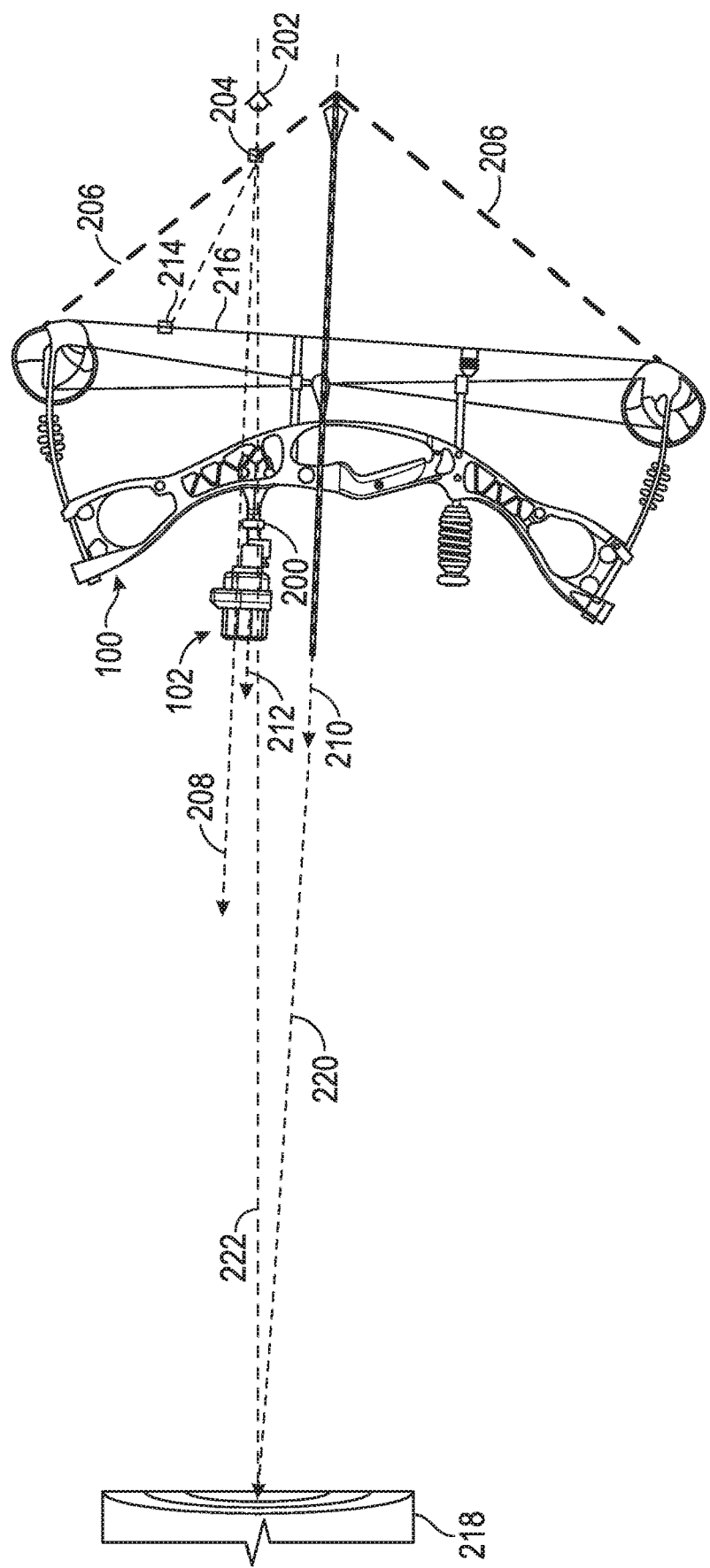
FIG. 2 is a side view of the targeting system and bow, illustrating a compensated targeting axis to a target.

FIG. 2 shows a side view of the bow 100 in both drawn and undrawn positions. A bow string 206, 216 provides an exemplary form of propulsion for arrow 106. Bow string 206 corresponds to bow 100 in the fully drawn position where bow string 206 and arrow 106 have been pulled by the user to an anchor point. Bow string 216 corresponds to bow 100 when in the undrawn position.

The targeting system 102 is aligned with bow 100 or positioned in front of bow 100 using the attachment arm 200. The attachment arm 200 places the targeting system 102 approximately 0.6 to 0.8 meters from an eye position 202 of the user when bow 100 is drawn.

In some embodiments, such as bow 100 being a compound bow, a peep sight 204 is attached to or incorporated within bow string 206. The peep sight 204 forms a small, circular opening through which the target scene and target sighting window 108 are viewed by the user from eye position 202. A line of sight 208 extends from eye position 202, through peep sight 204, through the target sighting window 108, to a target 218 while bow 100 is in the drawn position. Movement of peep sight 204 attached to bow string 206 from an unused initial position 214 to a drawn position is illustrated using a broken line.

To help illustrate use of targeting system 102, a plurality of axes are described herein only for illustrative purposes. It is to be understood that two or more of the axis may be directed in the same direction at some moments in time and each axis may be directed in different directions at other moments in time. A first axis, a line of sight 208, extends from eye position 202 through the target sighting window 108 to a target 218. When bow 100 is in the drawn position, line of sight 208 extends through peep sight 204. A second axis, a compensated targeting axis 210, corresponds to a trajectory of the arrow 106 after release. A third axis, a ranging module transmit axis 212, corresponds to the beam output from ranging module 500 towards target 218.

It is to be understood that FIG. 2 is not drawn to scale, but the compensated targeting axis 210 is generally illustrative of an initial inclination of the trajectory of the arrow 106 after release, and is generally aligned with (e.g., parallel to) a ranging module transmit axis 212 (discussed below). The arrow 106 follows a trajectory 220 through the air to a desired point on target 218. For instance, if arrow 106 travels a significant distance from bow 100 to reach a target 218 located at a similar height as bow 100, trajectory 220 rises to an apex before gravity and air resistance cause the arrow to descend to the target 218. It should therefore be appreciated that a compensated targeting axis 210 may be raised such that arrow 106 is aiming above the target 218. The compensated targeting axis 210 is the axis in which the arrow 106 travels initially upon leaving the bow 100. For a target 218 located at a similar height to bow 100, the compensated targeting axis 210 is typically above a target sight line 222 extending from eye position 202 to the target 218, such that (from the operator's perspective) the trajectory 220 of arrow 106 appears to be above the target 218. The location of variable compensated sighting mark 114, as discussed in depth below, is determined by the processor to enable the operator to orient bow 100 such that the compensated sighting mark 114 is placed onto a location of the desired target 218 (by viewing target 218 through the target sighting window 108).

Figure 5:
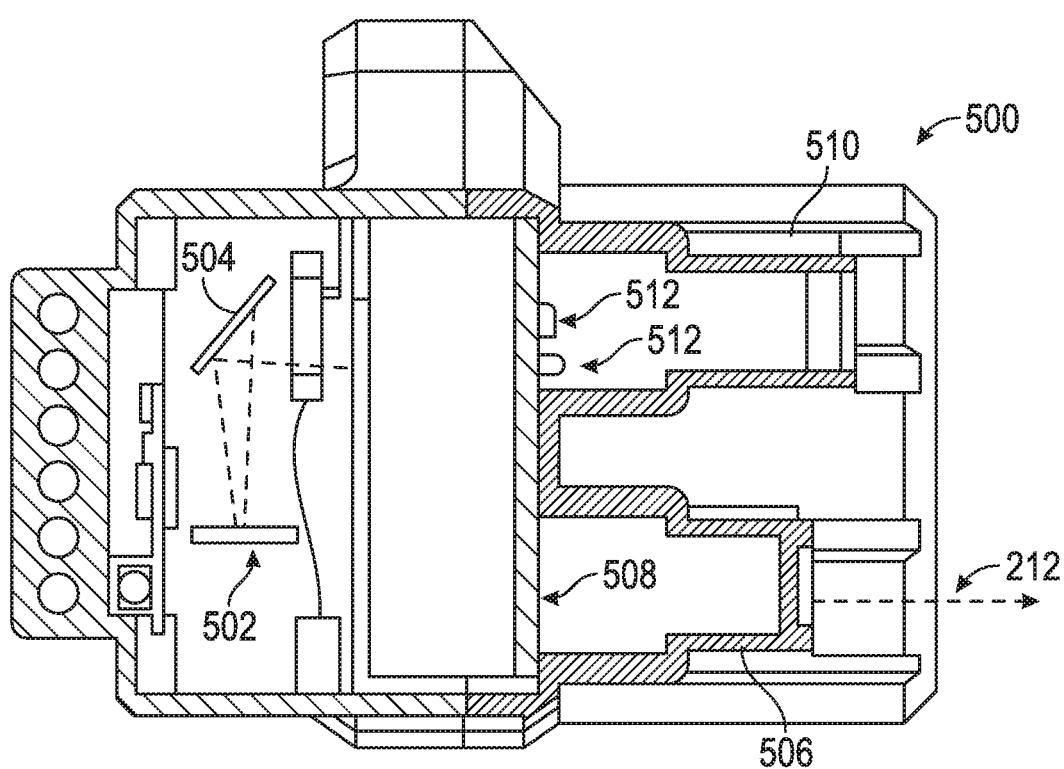
FIG. 5 is a vertical cross-section view of the internal components of the targeting system as seen through the 5-5 line of FIG. 4.
Figure 6:
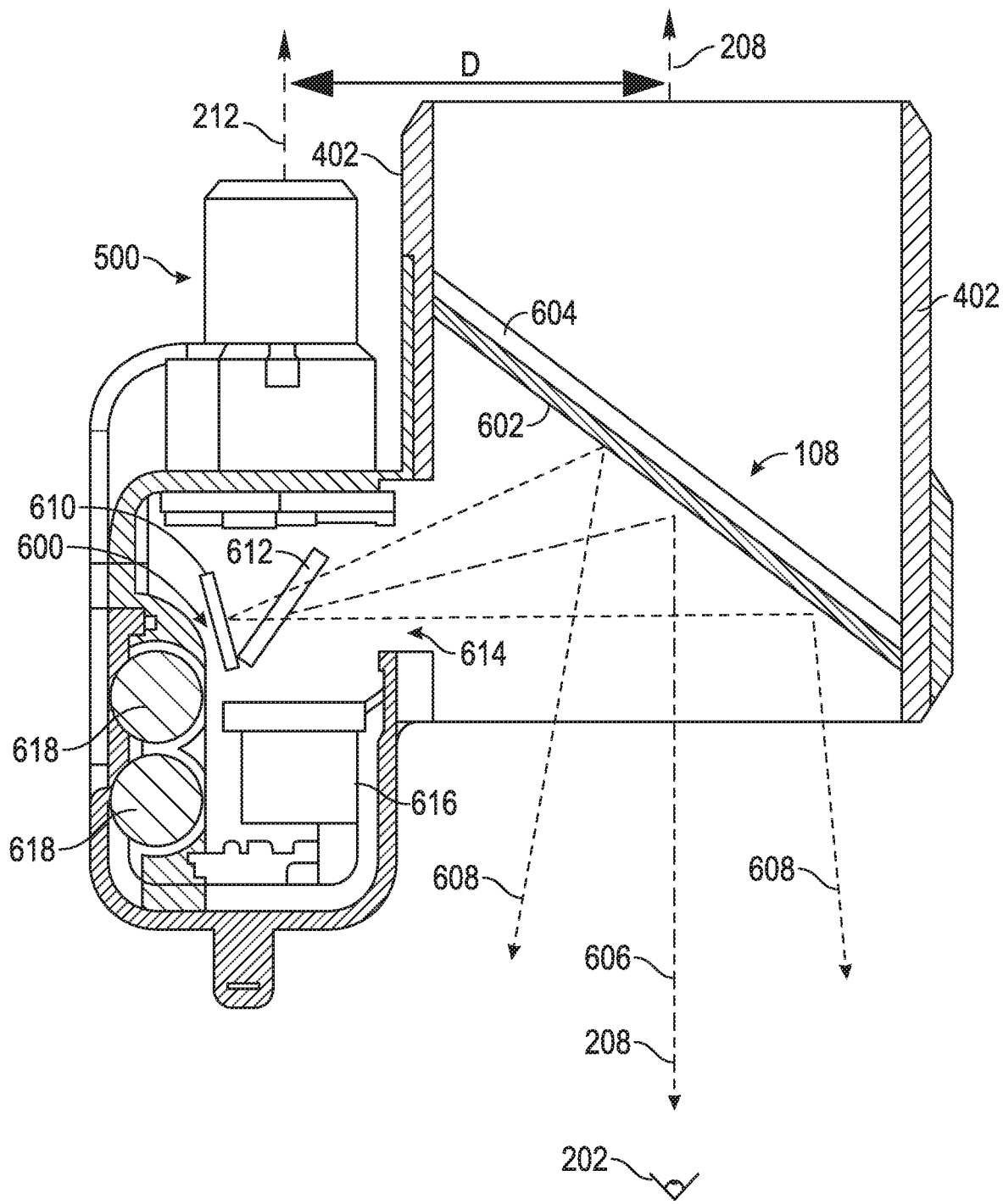
FIG. 6 is a horizontal cross-section view of the internal components of the targeting system as seen through the 6-6 line of FIG. 4.

In embodiments, the targeting system 102 comprises a ranging module 500 (illustrated in FIG. 5), a target sighting window 108, and a projector (best illustrated in FIG. 6). The ranging module 500 is operable to determine a range to a target 218 and has an associated ranging module transmit axis 212 along which a beam is transmit to the target 218 (a reflection of the beam from target 218 may follow the same path).

In some embodiments of the invention, the targeting system 102 may be integrated into the bow 100. In other embodiments of the invention, the targeting system 102 is a standalone device that is secured to the bow 100. In still other embodiments of the invention, the targeting system 102 is a standalone device that may additionally or optionally interface with other external devices (such as a bow camera, a smart phone, a location element, or other device).

Figure 3:
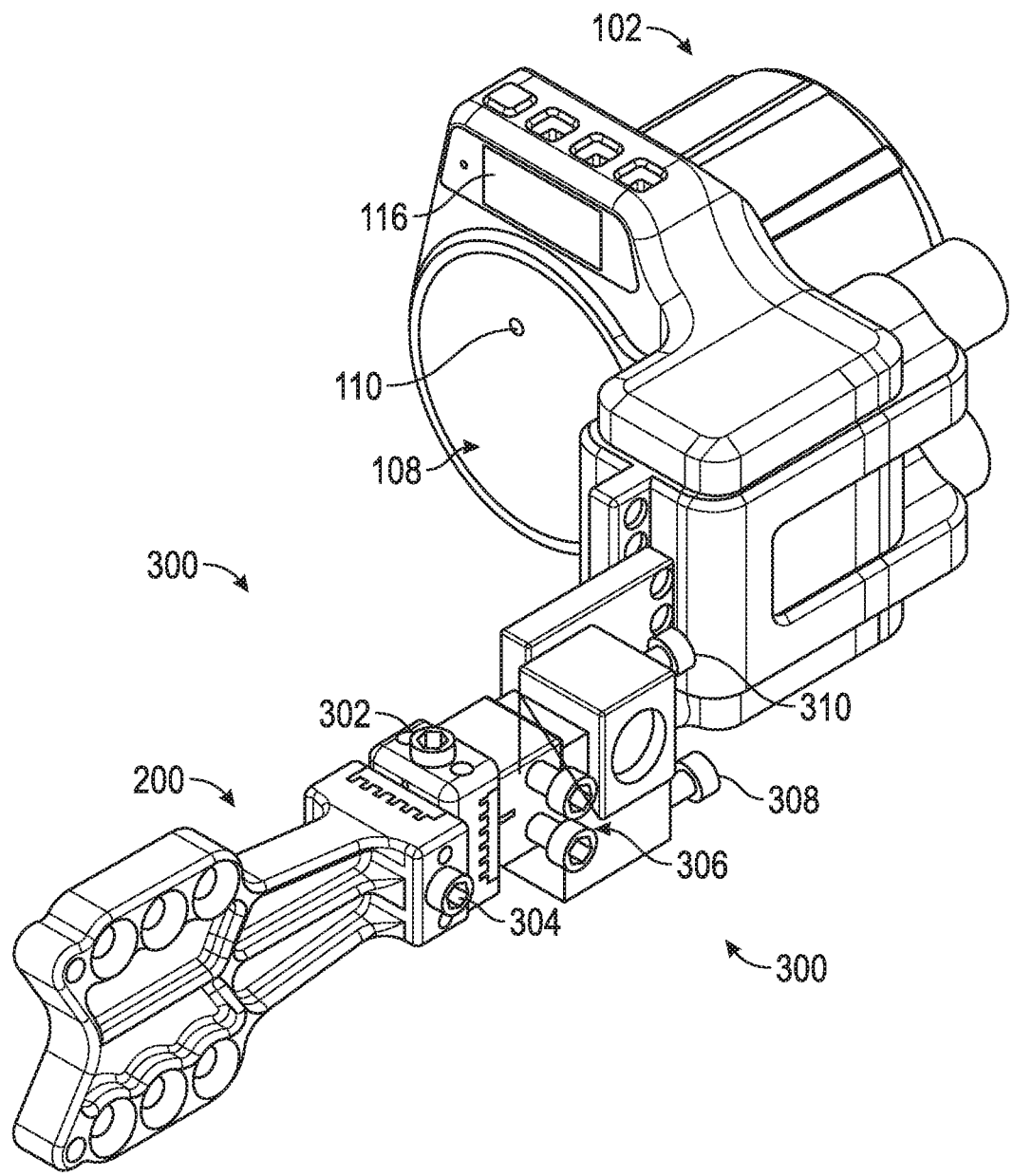
FIG. 3 is a perspective view of the targeting system, illustrating an attachment arm operable to be adjusted to align the targeting system with the bow.

FIG. 3 shows the targeting system 102 detached from the bow 100. The targeting system 102 may include target sighting window 108 as well as various sensors and circuitry to calculate a range from bow 100 to a target 218, determine an orientation of bow 100, or environmental conditions (e.g., wind sensor, ambient light sensor, etc.). Targeting system 102 may include a housing formed from a unitary assembly or combined in a semi-permanent configuration containing the components of targeting system 102.

As discussed below, the operator may align the targeting system 102 such that the fixed sighting mark 110 such that line of sight 208 intersects (coincides with) ranging module transmit axis 212 at a certain distance when target window 108 is viewed from a perspective corresponding to eye position 202. As seen in FIG. 6, line of sight 208 and ranging module transmit axis 212 are separated by a predetermined distance (e.g., 1-2 inches) and originate from eye position 202 and beam source 508, respectively. The separation between line of sight 208 and ranging module transmit axis 212 is identified by reference "D." Therefore, fixed sighting mark 110 enables a user to ensure that the target being aimed towards from eye position 202 corresponds to the beam output from ranging module 500 for accurately ranging the target 218. The attachment arm 200 therefore may be operable to be adjusted by the operator to provide this alignment of line of sight 208 and ranging module transmit axis 212. Such proper alignment is confirmed and adjusted as needed during the calibration process. The attachment arm 200 may be adjusted in a variety of manners to enable proper use of targeting system 102 with bow 100. For instance, the attachment arm 200 may include translation adjustments, angle elevation adjustments (which may be referred to as "pitch"), azimuth adjustments (which may be referred to as "yaw), and/or rotation adjustments (which may be referred to as "roll").

The attachment arm 200 may include or couple to an alignment mechanism 300 that provides translation of the targeting system 102 in elevation and azimuth to align a fixed sighting dot to the ranging module transmit axis 212 as well as the nominal trajectory 220 of the arrow 106. Exemplary components of the alignment mechanism 300, such as those for rack and pinion elevation 302 and azimuth adjustments 304 are shown. Further examples could include a rotational adjustment 306, which provides rotation or roll of the targeting system 102. A yaw sight adjustment 308 moves the targeting system 102 in a yaw direction, and a pitch sight adjustment 310 moves the targeting system 102 in the pitch direction. It should be appreciated that these adjustments are made relative to the bow 100 on which the attachment arm 200 is mounted.

Figure 4:
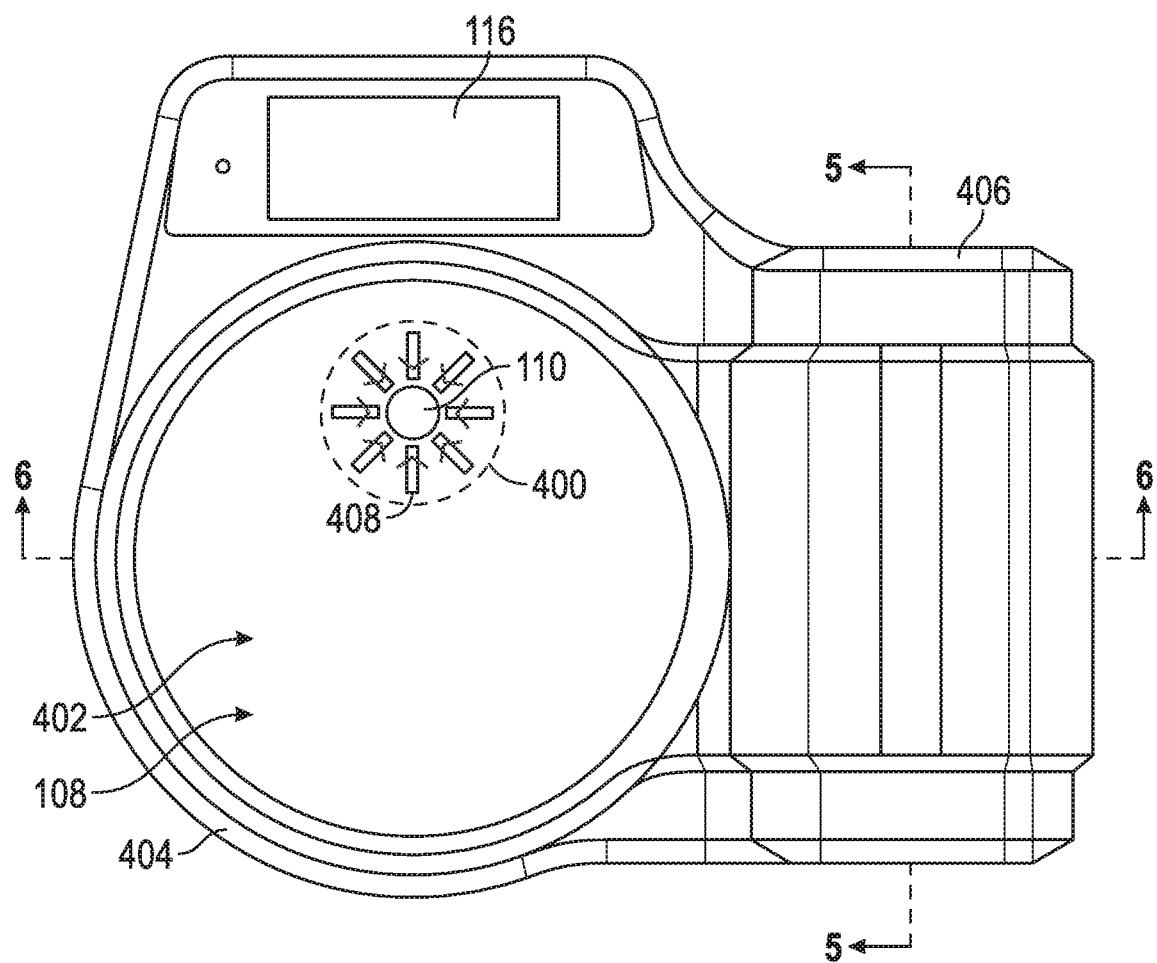
FIG. 4 is a rear view of the targeting system.

FIG. 4 illustrates an exemplary targeting system 102. Generally, the processor determines a range (distance) to a target 218 and controls projector 600 to present a variable compensated sighting mark 114 on target sighting window 108 so that the operator can orient the bow 100 and arrow 106 based on the location of the variable compensated sighting mark 114 to strike target 218 with the arrow 106. Ranging module 500 is communicatively coupled to the processor of targeting system 102 such that a distance as well as additional information to target 218 is determined by the targeting system 102. FIG. 4 illustrates a backside view of the targeting system 102 with a detail of a region of the window in proximity of the fixed sighting mark 110. In embodiments of the invention, the fixed sighting mark 110 is a dot or other shape presented on target sighting window 108. For instance, the fixed sighting mark 110 may be reflected onto a reflective side of the target sighting window 108 or permanently etched or printed on the target sighting window 108. If fixed sighting mark 110 is permanently shown on target sighting window 108, the fixed sighting mark 110 is visible without activating the targeting system 102. The fixed sighting mark 110 is used with laser sighting reticle 112 for initial targeting of the target 218 for ranging calculations.

In embodiments, the processor may present on the target sighting window 108 one or more alignment guidance marks 408 on target sighting window 108 to assist a user with orienting himself or bow 100 to bring fixed sighting mark 110 and laser sighting reticle 112 near or closer to each other when target window 108 is viewed from a perspective corresponding to eye position 202. In other words, because an initial orientation of bow 100 relative to a position of the operator's eye 202 may result in the fixed sighting mark 110 not being proximate to the laser sighting reticle 112, the processor of the targeting system 102 may present alignment guidance marks 408 indicating the direction in which bow 100 must be moved (oriented) to bring fixed sighting mark 110 and laser sighting reticle 112 near or closer to each other within an alignment region 400. The alignment region 400 represents a general area in which the fixed sighting mark 110 and the laser sighting reticle 112 are projected or presented. It should be appreciated that typically the alignment region 400 is not physically shown on the target sighting window 108, but is illustrated in FIG. 4 for illustrative purposes. The alignment guidance marks 408 assist a user with orienting himself (his eye position 202) or the bow 100 to which the targeting system 102 is attached to enter a small eye-box or viewing area in proximity of the operator's eye 202 and align fixed sighting mark 110 with laser sighting reticle 112 and thereby confirm the line of sight 208 intersects (coincides with) ranging module transmit axis 212 when target window 108 is viewed from a perspective corresponding to eye position 202.

In embodiments, each alignment guidance mark 408 may include or integrate arrows (or similar indicators of direction) to help the user properly align the bow 100 and targeting system 102 to reach alignment region 400. For instance, in certain orientations of the bow 100 relative to the user's eye 202, only one alignment guidance mark 408 may be visible from eye position 202.

The processor may control projector engine 616 and light array 110 to output any combination of the fixed sighting mark 110, laser sighting reticle 112, and alignment guidance marks 408. For example, in some embodiments, projector engine 616 may output a holographic image including one or more alignment guidance marks 408 and the laser sighting reticle 112 and light array 610 may output fixed sighting mark 110. In other embodiments, projector engine 616 may include an active display device, such as a liquid crystal on silicon (LCoS), which changes an orientation of the projected first sighting mark (laser sighting reticle 112) and/or the alignment guidance marks 408 on the target sighting window 108. Movement of the projected first sighting mark may allow aiming at a compensated distance to target 108 without the use of a peep sight 204. As a result, in such embodiments, both the alignment guidance marks 408 and the laser sighting reticle 112 appear to be located closer to target 218 than fixed sighting mark 110 when target window 108 is viewed from a perspective corresponding to eye position 202. In another example, projector engine 616 may output a holographic image including the laser sighting reticle 112 and light array 610 may output fixed sighting mark 110 and one or more alignment guidance marks 408. As a result, in such embodiments, both the laser sighting reticle 112 appear to be located closer to target 218 than fixed sighting mark 110 and the alignment guidance marks 408 when target window 108 is viewed from a perspective corresponding to eye position 202. In yet another example, the projector engine 616 may output a holographic image including alignment guidance marks 408 and light array 610 may output laser sighting reticle 112 and fixed sighting mark 110. As a result, in such embodiments, the alignment guidance marks 408 appear to be located closer to target 218 than fixed sighting mark 110 and laser sighting reticle 112 when target window 108 is viewed from a perspective corresponding to eye position 202.

FIG. 4 illustrates the target sighting window 108 including a window 402 disposed diagonally (as best illustrated in FIG. 6) to line of sight 208 and the ranging module transmit axis 212. The window 402 is enclosed, at least in part, by a window housing 404. The window housing 404 reduces glare on the window 402 and also provides for structural strength and protection for the window 402. The window housing 404 may be substantially tubular and the window 402 may present an elliptical shape. As such, the window 402 is disposed within the tubular window housing 404 at a diagonal angle (e.g., approximately 45 degrees, between 40 and 50 degrees, between 30 and 60 degrees, etc.) as viewed from above or below (as illustrated in FIG. 6).

The targeting system 102 also includes a projector housing 406 adjacent to the window housing 404. The projector 600 (as illustrated in FIG. 6) is disposed within the projector housing 406. The target sighting window 108 provides an unobstructed view of the target 218 as the projector 600 and the projector housing 406 are adjacent thereto. The projector housing 406 may also contain other components described herein such as the processor, the memory, the ranging module, the inclinometer, the accelerometer, a battery, or other components.

FIG. 5 illustrates a cross section of a ranging module 500, and also shows an illuminated reticule pattern generator 502 with associated folding optics 504. The ranging module 500 includes a transmit beam tube 506 having a beam source 508 therein. The beam source 508 outputs a beam directed along ranging module transmit axis 212 to the target 218. The ranging module 500 further includes a receive beam tube 510 having a beam receptor 512 therein. The beam receptor 512 detects reflected beams from target 218 and also detects various properties of the reflected beams (such as time of flight, frequency, wavelength, angle received from, or other property).

In embodiments of the invention, the ranging module 500 is configured to emit a beam and receive a reflected beam from a target 218. The emitted beam may be a laser beam, an energized beam, a light beam, a radar beam, an infrared beam, a sonar beam, an ultraviolet beam, or other electromagnetic or physical beam. In some embodiments of the invention, the ranging module 500 may include a plurality of sensors that utilize any or all of the above-discussed types of signals. The ranging module 500 may alternatively or additionally include a camera for the detection of visible light. Typically, the ranging module 500 will be oriented relative to the bow 100 outward in a certain range or field, as set by the attachment arm 200 discussed above.

Signals reflected back to the ranging module 500 are analyzed by the processor of the targeting system 102 to determine a distance and/or direction to target 218 from bow 100 and arrow 106. Typically, the processor may determine the distance from the ranging module 500 to the target 218 (as illustrated as FIG. 2) by analyzing the reflected beam and the outputted beam to calculate a duration of time that passed for the beam to travel to target 218 and reflect back to ranging module 500. Signals received outside a certain range may be discarded as not being reflected from the target 218. It is to be understood that the processor of targeting system 102 performs the analysis of the reflected signals and a portion of the processor may be within the ranging module 500. This analysis determines the range (distance) to the target 218 as measured from the ranging module 500. The ranging module 500 may also detect a relative altitude of the target 218 relative to the ranging module 500. The relative altitude may be measured by use of an inclinometer.

The hardware associated with the projection of any sighting marks projected on target sighting window 108 is illustrated in FIG. 6, and projector 600 will now be discussed in detail. As discussed above, in embodiments, the sighting elements may be presented on one transparent surface such that one element is projected onto the surface and appears to be closer to the target than the other sighting element when target window 108 is viewed from a perspective corresponding to eye position 202. For instance, targeting system may be configured to present a first sighting element (a fixed sighting mark 110) on a target sighting window 108 and control projector 600 to present a second sighting element (a laser sighting reticle 112) onto the target sighting window 108.

The projector 600 outputs various lights, beams, or other energized particles toward the window 402 that includes a reflective side 602, and a transmissive side 604. The beam is reflected off the reflective side 602 of the target sighting window 108 and toward the operator's sight. A direct beam 606 may reflect directly toward the operator, while a wide-angle beam 608 may reflect outward. During ranging to a target 218, a laser sighting reticle 112 is projected on target sighting window 108 in such a manner that it appears to be closer to target 218 than the fixed sighting mark 110 when target window 108 is viewed from a perspective corresponding to eye position 202. When both sighting marks are aligned, the line of sight 208 intersects (coincides with) ranging module transmit axis 212 to enable accurate ranging to a target 218 when target window 108 is viewed from a perspective corresponding to eye position 202.

After ranging, one or more variable sighting marks 114 are presented on the surface of the target sighting window 108 to enable a user to orient bow 100 and arrow 106 to strike target 218. Unless the target is located at a distance corresponding to fixed sighting mark 110, the variable sighting mark 114 presented on target sighting window 108 at a location different from the location of the fixed sighting mark 110 based on a determined distance to a target 218 as well as other criteria. In embodiments, sighting marks 110, 114, 900 are not visible from the transmissive side 604 of the targeting system 102. As such, the target 218 (such as an animal) will not be able to see the sighting marks 110, 114, 900 or other information presented on the reflective side 602 of the target sighting window 108, so as to increase the stealth of the operator in firing at the target 218 and to prevent any light from being transmitted toward the target 218.

In embodiments of the invention, the processor is operable to utilize and control a light array 610 to present one or more of sighting marks 110, 114, 900 (e.g., thirty, sixty, etc.). Selection of the separation and number of sighting marks 110, 114, 900 is based on the targeting accuracy and maximum compensated distance to the target 218. At a given distance, the physical size of the desired target zone relates to the separation of sighting marks 110, 114, 900. Each sighting mark 110, 114, 900 is produced by one or more LEDs of light array 610 emitting light. As can be seen in FIG. 6, the light emitted by the LEDs is directed toward the diagonal window 402 of the target sighting window 108 and then reflected therefrom to the operator's eye 202. The LEDs may have an adjustable brightness level, as influenced by ambient conditions (as detected by an ambient light sensor discussed below) and/or user selection.

In some embodiments, sighting marks 110, 114, 900 may originate from projector engine 616 and are projected onto target sighting window 108. In other embodiments, sighting marks 110, 114, 900 may originate from a light array 610 and are reflected onto target sighting window 108. For example, light array 610, a combiner mirror 612 and a window opening 614 allow light from the light array 610 to reflect onto target sighting window 108. The light array 610 may limit visible light that may be output toward the target 218 (such as an animal that may become alerted by visible light). The light array 610 is adjacent to, but distinct from a projector engine 616. The combiner mirror 612 combines the visual field of the light array 610 with the floating laser sighting reticle 112 projected from projector engine 616 indicating the ranging module transmit axis 208. The targeting system 102 may further include a light array 610 that is disposed vertically. The light array 610 is itself or is a component of the projector 600. The light array 610 is disposed vertically (relative to an artificial horizon) because sighting marks will be disposed vertically. The adjustment due to the distance to the target 218 are vertical adjustments.

As such, the sighting marks 110, 114, 900 are typically disposed vertically, as each sighting mark 110, 114, 900 will be aligned on a vertical axis. In other embodiments, each sighting mark 110, 114, 900 may be offset from the vertical axis, to provide improved visibility and compensate for other known variables. For example, if the targeting system 102 has access to weather information, such as through a smart phone or other Internet-accessible device or a wind sensor or manual input, the variable sighting mark 114 presented on target sighting window 108 may provide a compensation for wind based upon a known orientation of the targeting system 102 as received from a magnetometer, which is schematically illustrated in FIG. 11. In some embodiments of the invention, the light array 610 includes a set of light emitting diodes (LEDs). The set of LEDs of light array 610 may be disposed vertically so as to provide a variable sighting mark 114 at a location on target sighting window 108 that corresponds with the compensated targeting axis 210 determined based on distance, wind and other variables.

The light array 610 may additionally or alternatively include a liquid crystal display (LCD), a liquid crystal on silicon display (LCOS), an organic light emitting diode display (OLED), and/or another type of light projection. The light array 610 may be operable to output a set of vertically-aligned sighting marks 110, 114, 900 that reflect onto the target sighting window 108. In other embodiments, light array 610 may be operable to project the vertically-aligned sighting marks onto the target sighting window 108.

Upon a detection of a reflected signal by the beam receptor 512, the processor may analyze the reflected signal to determine a distance to the target 218 and various characteristics of the target 218 as indicated by the reflected signal, via a computer program stored on the memory (being a non-transitory computer readable storage medium). The processor may analyze the target data in raw reflected signal information and determine target indications.

Also illustrated in FIG. 6 is a power source 618. The power source 618 provides power to the various electronic components of the targeting system 102. An example of a power source 618 could be two AA batteries, as illustrated at cross-section in FIG. 6. The power source 618 may be removable and replaceable upon becoming depleted, or may be internally rechargeable (such as by plugging in the targeting system 102 to an external power system. The power source 618 may additionally or alternatively include a solar panel (not illustrated) for providing at least a portion of the power that is consumed by the targeting system 102.

In embodiments of the invention, the targeting system 102 presents the variable sighting mark 114 and fixed sighting mark 110 on target sighting window 108, such as by placement on target sighting window 108 or reflection onto target sighting window 108. Additionally, the targeting system 102 presents the laser sighting reticle 112, such as via a projection, on the target sighting window 108 such that laser sighting reticle 112 appears closer to the target than the variable sighting mark 114 and fixed sighting mark 110 when target window 108 is viewed from a perspective corresponding to eye position 202. The processor stores in memory a location of the laser sighting reticle 112 and a location of the fixed sighting mark 110. The processor presents the laser sighting reticle 112 and fixed sighting mark 110 and when the laser sighting reticle 112 and fixed sighting mark 110 align, the line of sight 208 intersects (coincides with) ranging module transmit axis 212 to enable accurate ranging to a target 218 when target window 108 is viewed from a perspective corresponding to eye position 202. In some embodiments, the processor controls light array 610 and/or projector engine 616 to present the variable sighting mark 114 after the ranging module 500 has determined a range to the target. For example, the variable sighting mark 114 may be presented on target sighting window 108 when triggered by a detected movement of the weapon, a detected pressure against a component of the weapon, a selection or powering by the operator, a detection that the weapon is about to fire (such as by the disabling of a safety device or pulling back of the bow string 206, or other triggering event). In other embodiments, the variable sighting mark 114 is presented on the target sighting window 108 when a target 218 is detected. In still other embodiments, the variable sighting mark 114 is permanently displayed while the bow 100 is operational and/or loaded. In some embodiments, the operator may manually select to view one or more sighting marks 110, 114, 900 when desired. Upon a triggering event, the one or more sighting marks 110, 114, 900 are presented on the respective display and may include an alert to the operator (such as a visual and/or audio signal indicative that the one or more sighting marks 110, 114, 900 are being shown).

Figure 9:
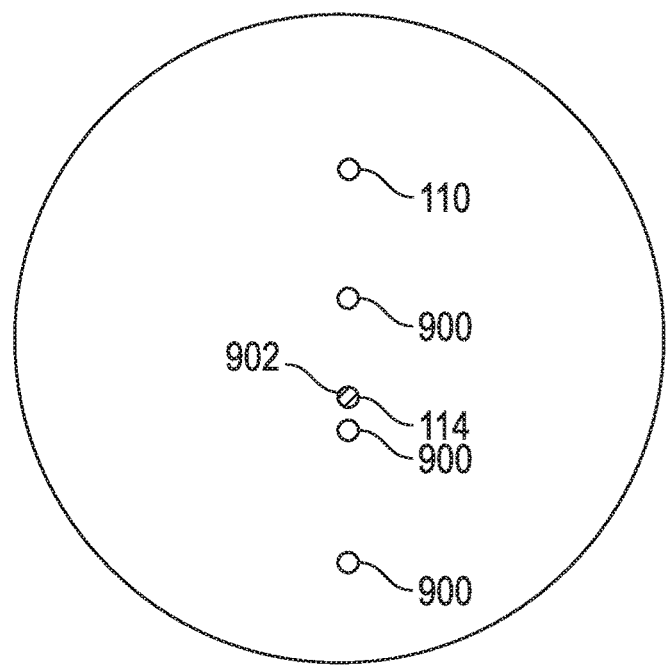
FIG. 9 is a display diagram illustrating a set of user-defined sighting marks displayed around a variable sighting mark for the target.

It should also be appreciated that FIG. 7 and FIG. 9 illustrate exemplary displays and that various embodiments of the invention may include displays that look different than FIG. 7 and FIG. 9. The processor controls light array 610 and/or projector engine 616 to present a simplified interface so as to clearly present information to the operator on target sighting window 108 without providing excessive information that may obstruct the operator's view of the target 218 or distract the user. The processor projects or otherwise displays a variable sighting mark 114 on the target sighting window 108 so as to enable the operator to observe the target 218 with a substantially unobstructed view.

The alphanumeric display 116 presents information indicative of the target 218 determined by the processor. The target description may be a string, a number, a graphic, a representation, or other illustration based upon the available information for the target 218. The target description therefore provides the operator with the available information about the target 218 in an easy-to-read representation. This information may include distance, direction, location, angle upward or downward, the horizontal component of the distance, or some combination thereof. It should be appreciated that, as used herein, "icon" and "graphic" may refer to any graphical representation of the respective information. An "icon" or a "graphic" may include graphics, pictures, photographs, words, numbers, symbols, lines, colors, opacity, cross-hatching, and other fill textures and visual representations of information. The "icon" or "graphic" may also change, alter, update, and delete as new information is obtained. For example, as a target 218 and/or bow 100 moves, additional or updated information may be displayed. Similarly, if the target 218 is no longer detected by the processor, the processor may cause the target description to be removed from the alphanumeric display 116. In embodiments of the invention, the target description is indicative of a determined distance to the target 218. In some embodiments, the distance to the target 218 may be expressly shown on the alphanumeric display 116.

FIG. 7 shows a simplified view of the targeting system 102 containing the target sighting window 108, alphanumeric display 116 and a plurality of user interface elements 700 (e.g., a set of depressible switches). The targeting system 102, upon the processor determining activation of one or more of said user interface elements 700 (or other power switch, not illustrated), may illuminate one or more sighting marks 110, 114, 900 for low-light conditions. A pressure switch 702 coupled with the processor is typically mounted on or near the arrow rest 104 to allow simple control over the sighting/ranging process. Upon sustained depression of the pressure sensitive switch 702, the processor may activate the alphanumeric display 116 and present a measured distance 704 to target 218.

The processor may control projector 600 to present two sighting elements 110, 112 in such a manner that one of the sighting elements appears to be closer to the target 218 than the other sighting element when target window 108 is viewed from a perspective corresponding to eye position 202. For example, the processor may utilize projector 600 (including a light array 610 and a projector engine 616) to present on a transparent target sighting window 108 a first sighting element that appears to be positioned or presented on the surface of the target sighting window 108 and a second sighting element projected onto the target sighting window 108 such that the second sighting element appears to be closer to the target 218 than the first sighting element when target window 108 is viewed from a perspective corresponding to eye position 202. Similarly, the two sighting elements 110, 112 may be presented on parallel, transparent target sighting windows 108 such that a first sighting element is positioned or presented on a first target sighting window 108 and a second sighting element is positioned or presented on a second target sighting window 108, where the second target sighting window 108 is closer to the target than the first surface when target window 108 is viewed from a perspective corresponding to eye position 202.

For example, in embodiments, the processor controls projector 616 of projector 600 to project onto target sighting window 108 the first sighting element, such as the laser sighting reticle 112, and light array 610 of projector 600 to present on the target sighting window 108 the second sighting element, such as the fixed sighting mark 110. In such an example, the projected laser sighting reticle 112 appears to be closer to the target 218 than the fixed sighting mark 110 that appears to be positioned on the reflective side 602 of the target sighting window 108 when target window 108 is viewed from a perspective corresponding to eye position 202. The projected sighting element, such as the laser sighting reticle 112 or tar, has an apparent origin at some distance in the far field (for example, 5 yards or 20 yards) in front of the targeting system 102. In this example, the projected laser sighting reticle 112 appear to float relative to the fixed sighting mark 110, which appears to be fixed on the target sighting window 108.

When both sighting elements 110, 112 are aligned by the user, the user's line of sight 208 intersects (coincides with) ranging module transmit axis 212 to enable accurate ranging to a target 218 when target window 108 is viewed from a perspective corresponding to eye position 202. As a result, the laser sighting reticle 112 is aligned to the ranging module transmit axis 212 and corresponds to a location at which a beam output by ranging module is pointing.

The alignment region 400 surrounding the fixed sighting mark 110 may represent the area over which the collimated laser sighting reticle 112 is projected. It is known that the size of projected elements, such as laser sighting reticle 112, is correlated to the physical envelope of the collimation optics 504 (e.g., a mirror) and illumination source 502 contained within the targeting system 102. The linear extent 706 of the laser sighting reticle 112 is extended beyond the nominal eye-box to allow viewing a portions of the cross-pattern well past the extent of the alignment region 400. The large projection angular extent provides the capability to view the laser sighting reticle 112 even if viewed significantly off-axis. In embodiments, upon release of the depressible trigger 702, a distance 704 to the target is presented on alphanumeric display 116, and a target-specific variable compensated sighting mark 114 is presented on target sighting window 108. The processor may determine the location of the variable compensated sighting mark 114 on target sighting window 108 based on a measured range (distance) to target 218 and an elevation inclination of the ranging module 500 when a beam was output to range the target.

In embodiments, the laser sighting reticle 112 presents a shape adapted to allow the operator to center the laser sighting reticle 112 around the fixed sighting mark 110. When the fixed sighting mark is centered within the laser sighting reticle 112 when target window 108 is viewed from a perspective corresponding to eye position 202, both sighting elements 110, 112 are aligned and the user's line of sight 208 intersects (coincides with) ranging module transmit axis 212 to enable accurate ranging to a target 218. The shape of the laser sighting reticle 112 may be generally x-shaped, cross shaped, crosshair shaped, reticle shaped, angularly extending line shape, or other shape. The operator aligns an intersection of the laser sighting reticle 112 center with the fixed sighting mark 110 so as to center the sighting elements 110, 112 thereby aligning the user's line of sight 208 intersects (coincides with) ranging module transmit axis 212 when target window 108 is viewed from a perspective corresponding to eye position 202.

User interface elements 700 couple with the processor and provide operator access to a variety of modes of operation. An exemplary layout of user interface elements 700 could include an enter switch 708, a left/down switch 710, a right/up switch 712, and a back switch 714. It should be appreciated that other layouts and switches may be utilized to allow the operator to enter the requested information and to perform the various desired functions.

Figure 8:
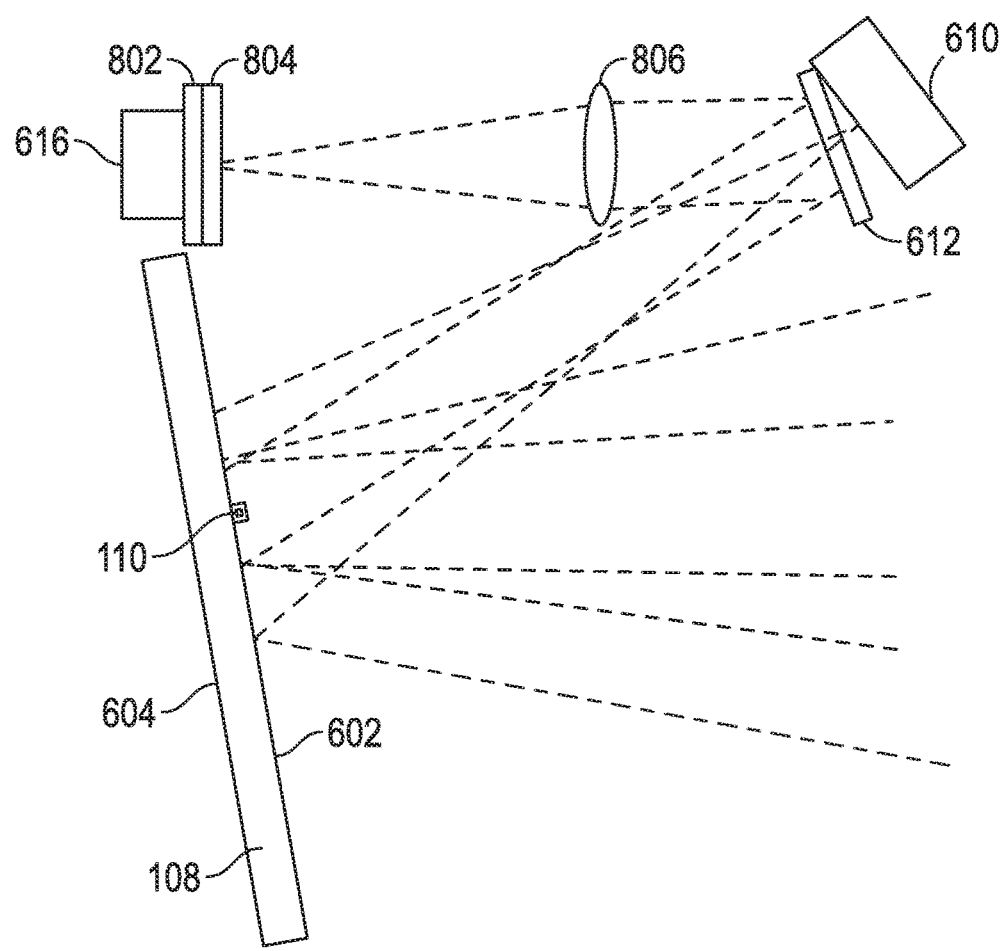
FIG. 8 is an optical block diagram illustrating components of a projector.

FIG. 8 illustrates an optical block diagram. One embodiment provides both a projected laser sighting reticle 112 focused into the far-field and a series of selectable elevation-offset variable compensated sighting marks 114 roughly appearing to be presented on the target sighting window 108. In embodiments, the collimated laser sighting reticle 112 does not fill the entire display region of the target sighting window and may provide collimated colored pattern superimposed and centered around the fixed sighting mark 110 to indicate the ranging module transmit axis 212 for both initial alignment during calibration and to indicate the orientation of the bow 100 during the active shot targeting process.

Continuing with FIG. 8, the projected laser sighting reticle 112 may originate in projector engine 616 followed by a diffuser 802 and patterned optical mask 804. The patterned optical mask 804 is projected into the far-field using collimating lens 806 followed by light array 610 and a combiner mirror 612 directing the projection towards the reflective side 602 of the target sighting window 108. The reflective side 602 of the window 402 has a partially reflective coating while the reflective side 604 has an anti-reflective coating to prevent the formation of a double image when the operator views the projected sighting marks. The laser sighting reticle 112 appears to surround the fixed sighting mark 110 when the ranging module transmit axis 212 is parallel with the arrow trajectory 220 defined by the peep sight 204 and fixed sighting dot. Located immediately behind the folding mirror is a light array 610 that projects a line of dots indicating the variable sighting mark 114 when viewed off the target sighting window 108. One or more sighting dots are presented or projected towards the viewer when the targeting system 102 is active. The vertically-aligned array of sighting marks 110, 114, 900 fills a relative large field of view in elevation as illustrated by a beam envelope of the light array 610. To increase the size of the alignment region 400 sighting mark openings radiating out from the center of the reticule allow viewing outside the central alignment region 400 angular field of coverage.

FIG. 9 shows a series of sighting point positions generated by the light array 610 presented on window 402 of target sighting window 108. As opposed to the laser sighting reticle 112, which is used in the sighting process to determine a range (distance) to a target 218, one or more of the variable sighting marks 114 produced by the light array 610 are selected by the processor based on the measured distance and inclination of the shot.

In embodiments, a user-defined sighting mark 900 will relate to a specific distance and inclination of the shot, as discussed in depth below. Additional information may be provided by the projector through the activation of additional user-defined sighting marks 900 or other informational sighting marks surrounding the target-specific sighting mark based on measured distance and inclination. The color of the various sighting marks may change based on day or night use, to improve color contrast against a background, or to indicate different targeting conditions. As shown in FIG. 9, the processor may present on target sighting window 108 a variable sighting mark 114 as well as one or more user-defined sighting marks 900. Each user-defined sighting mark 900 is associated with a known targeting axis at a certain targeting distance. Each user-defined sighting mark may be determined and stored in memory within a user profile during the calibration process. Each user-defined sighting mark 900 has a related targeting distance. For instance, the fixed sighting mark 110 may correspond to a baseline distance of 20 yards to the target 218 when laser sighting reticle 112 is centered with the fixed sighting mark 110 (aligning the user's line of sight 208 with ranging module transmit axis 212 at 20 yards) when target window 108 is viewed from a perspective corresponding to eye position 202. Each subsequent user-defined targeting point may be associated with an interval relative to the baseline distance (for example, 30 yards, 40 yards, and 50 yards). The variable sighting mark 114 that is associated with each interval distance is determined during the calibration process, as discussed below.

It should be appreciated, however, that sighting marks 110, 114, 900 apply for a particular operator, bow 100, and type of arrow 106. If any of these conditions are changed (for example, the targeting system 102 is attached to a different type of bow 100, or the operator switches to a heavier arrow 106), the operator may then re-calibrate the targeting system 102 for the changed condition and store the calibration information in the memory of the targeting system 102. In embodiments, the user interface elements 700 may be utilized to switch between calibrations, which may be stored in memory as profiles. If the profile is changed, the processor may present each of sighting marks 110, 114, 900 differently to account for the changed conditions).

FIG. 9 further illustrates a target-specific sighting mark 902 of the variable sighting mark 114 being displayed with sighting marks 110, 114, 900. For instance, the variable sighting mark 114 may include a target-specific sighting mark 902 disposed between two user-defined sighting marks 900 of the set of user defined sighting marks 900. The acquired range indication (for the current target 218) is between the two certain targeting distances associated with each said two user-defined sighting marks 900. This is because to reach a target 218 between the two certain targeting distances, the variable sighting mark 114 is displayed between them. However, it should be appreciated that the relationship between the distances and the variable sighting mark 114s is not linear. This is because the drop of the arrow 106 is an acceleration toward the earth due to the pull of gravity.

The following discussion describes procedures that can be implemented in a targeting system 102. The procedures can be implemented as operational flows in hardware, firmware, software, or a combination thereof. These operational flows are shown below as a set of blocks that specify operations performed by one or more devices and are not necessarily limited to the orders shown for performing the operations by the respective blocks. The features of the operational flows described below are platform-independent, meaning that the operations can be implemented on a variety of device platforms having a variety of processors.

Before discussing the steps performed by the targeting system 102, exemplary steps performed by the operator will be discussed to provide an example of how embodiments of the invention may be used. In this example, the operator uses a bow 100. An operator observing a target 218 picks up the bow 100 and momentarily depresses a trigger 702 located in close proximity to the handle of the bow 100. The targeting system 102 becomes active and alphanumeric display 116 displays the last distance measurement and the elevation offset associated with that distance. If the operator is roughly in the same relative position to the target 218, the bow string 206 may be drawn and an arrow fired using the previous distance and elevation information. If the operator's position relative to the target 218 has changed, the trigger 702 may be depressed and held resulting in the activation of the integrated ranging module 500 and inclination sensor. The alphanumeric display 116 and laser sighting reticle 112 become active providing the display of measured distance and optionally inclination. The measurement rate may be operator selectable or defaults to a nominal rate (such as 10 Hz) to minimize measurement lag tracking a moving target 218. The fixed sighting mark 100 and laser sighting reticle 112 may be utilized to aim for a target 218 to be ranged. Once comfortable with an aim point on the target 218, the processor senses a release of the depressible trigger 702, resulting in the processor calculating a distance to the target 218 and a recommended elevation aim point compensation along with activation of a corresponding fixed sight offset indication and/or variable sighting mark 114. If the bow string 206 was not drawn during ranging, the bow string 206 is drawn with the variable sighting mark 114 used to aim towards a target and a shot is taken by the operator. If the trigger 702 is not depressed or activated for a predetermined time-out period, the targeting system 102 deactivates the various sighting marks 112,114 and the alphanumeric display 116. If an acceptable target 218 is identified at a similar distance and inclination, the trigger 702 can be momentarily depressed and a new shot can be made without a new range measurement. If a new target 218 appears with a different range or inclination condition, the trigger 702 depression time can be extended to reinitiate a new distance measurement and update compensated sighting point.

Another example may include controlling the targeting system 102 using the trigger 702 to toggle the measurement state of the targeting system 102. A mode selected through the system menu initiates fixed-frequency operation of the ranging module 500, the alphanumeric display 116 and the laser sighting reticle 112. Depressing the trigger 702 terminates this looped ranging operation, freezing the distance display while activating the appropriate variable sighting mark 114 sighting point based on the held distance and inclination. The processor may cause a set of sighting marks 110, 114, 900 stored in memory to be presented on target sighting window 108 upon sensing successive depressions of trigger 702. Similarly, if the operator desires to start a new sighting process, the trigger 702 can be depressed again momentarily and the ranging module 500 restarts along with associated display elements. If the operator wishes to store a measurement and put the targeting system 102 to sleep, the trigger 702 can be depressed for a longer period. A momentary depression of the trigger 702 may re-wake the system indication of the previous saved distance and compensated sight point. Thus, use of the trigger 702 allows quick targeting without repeating the initial steps of the above-discussed process. Lack of activity for a period of time may still cause shifting to a sleep state as in the previous operational scenario.

Exemplary steps performed by the operator in setting up the bow 100 will now be discussed. After the targeting system 102 is mounted to the bow 100, the vertical and horizontal lateral adjustments on the attachment arm 200 are used by the operator to position the fixed sighting mark 110 to the arrow's approximate trajectory 220 over the baseline distance (e.g., 20 yards, 40 yards, etc.), which may relate to the type of bow 100, the type of arrow 106 and other factors. The operator moves to the desired targeting distance desired for the baseline distance for the fixed sighting mark 110. The operator performs one or more test shots at the baseline distance by aligning his aim by centering the fixed sighting mark 110 and laser sighting reticle 112. The operator may then adjust the vertical and horizontal lateral position of the targeting system 102 to correct for any targeting discrepancy between the fixed sighting mark 110 and the cluster of arrow impact points on the target 218. The operator may then activate power to the targeting system 102 followed by depressing the trigger 702 located near the arrow rest 104 to activate the ranging module 500 and the associated collimated laser sighting reticle 112 indicating the pointing direction of the ranging module 500. The operator may then again draw the bow string 206, aim at the target 218 using the fixed sighting mark 110 and laser sighting reticle 112 (as well as peep sight 204) at the distance used to previously to calibrate the fixed sighting mark 110. If the fixed sighting mark 110 or laser sighting reticle 112 is not sufficiently accurate, the operator may adjust pitch and yaw adjustment on the attachment arm 200 to move the fixed sighting mark 110 and/or laser sighting reticle 112 in the direction of the targeting error. The operator may then repeat the above-discussed steps as required until there is sufficient alignment between the fixed sighting mark 110 and laser sighting reticle 112 for the baseline distance.

Once the ranging module 500 is nominally aligned to the fixed sighting mark 110, the operator will enter a target-distance calibration mode, such as by using the user interface elements 700. The collimated laser sighting reticle 112 will deactivate and the operator will move to a longer distance than the baseline distance (for example, if the baseline distance was twenty yards, the operator may move back from the target 218 to a distance of 30 yards from the target 218). The operator will then depress the trigger 702 near the arrow rest 104 to obtain the range, draw the bow string 206 and aim at the target 218 using the fixed sighting mark 110 and laser sighting reticle 112. When the operator releases the trigger 702, a variable sighting mark 114 is displayed (typically below the fixed sighting mark 110 on level ground) with an offset distance determined by the processor based on at least the distance to target 218. The offset distance is associated with the compensated targeting axis 210, and may additionally be based on default parameters (such as an average or standard draw weight, arrow weight, or other ballistic characteristics). The operator may then fire one or more arrows at target 218 using the variable sighting mark 114 and noting actual impact point, measure the discrepancy either directly at the target 218 or by counting a number of displayed dots between the variable sighting mark 114 and the actual impact location. Additionally, or alternatively, the operator may physically measure the miss distance in proximity to the target 218. If the sight displayed sight point was adequate, the operator may then enter normal sighting operation using the user menu and controls, as discussed above. If the sighting point was in error, enter the error distance and/or the number of displayed dots along with the direction of the error (above or below) using the menu controls.

Figure 10:
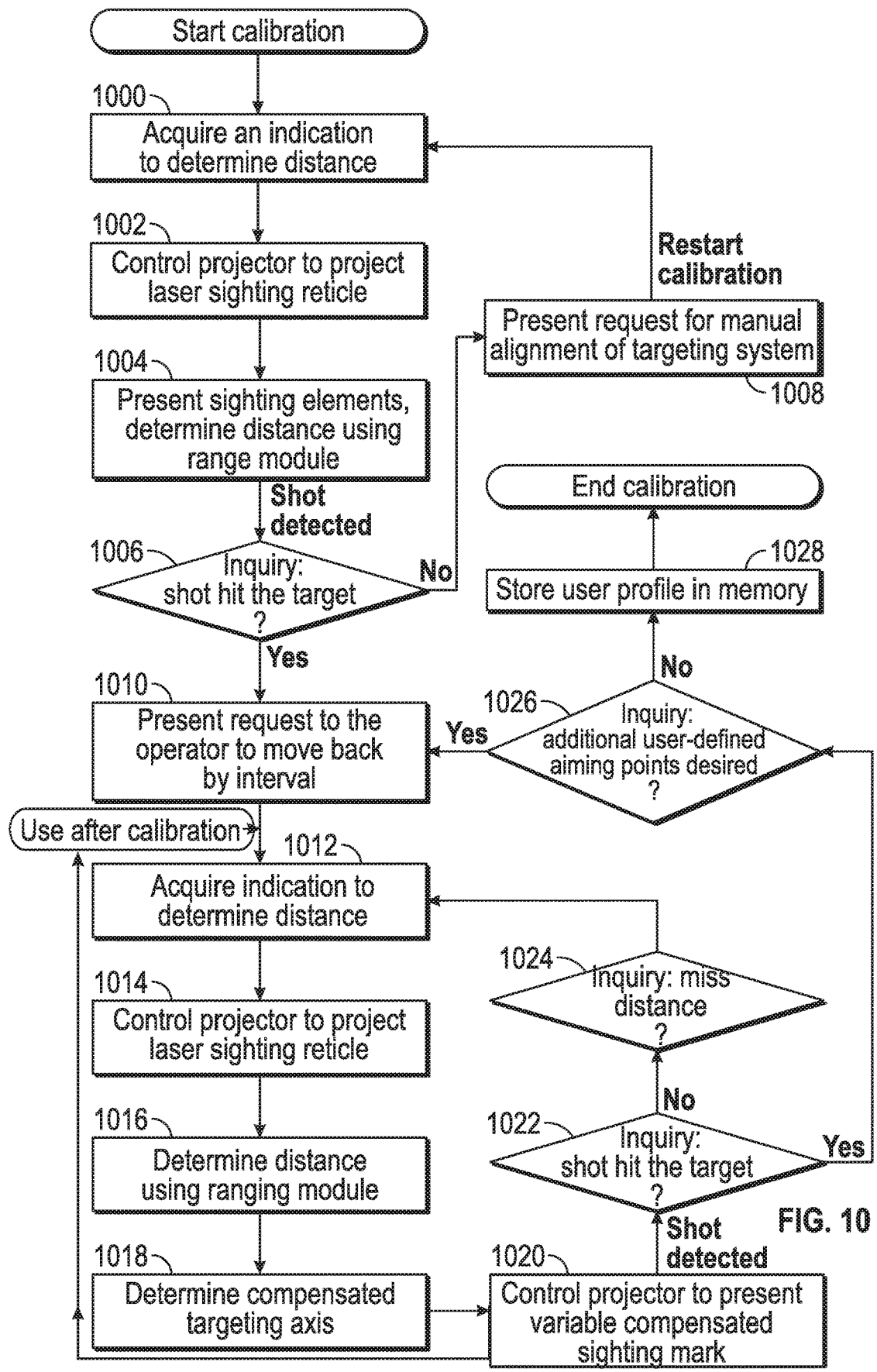
FIG. 10 is a block flow diagram illustrating exemplary steps performed by a processor.

FIG. 10 presents a flowchart illustrating the operation of a method performed by a processor. While the various procedures and methods have been discussed throughout, general steps of the method will now be described. In embodiments of the invention, a computerized method is utilized for performing the discussed steps. In other embodiments, a non-transitory computer readable medium has a computer program thereon. The computer program instructs at least one processing element to perform the discussed steps. As discussed herein, the processor may be the microcontroller discussed below, or another processor associated with the targeting system 102. The steps of the described method may additionally or alternatively be performed by more than one processing element.

FIG. 10 generally illustrates a method of calibrating and using the targeting system 102 after calibration. In Step 1000, the processor acquires an indication that the operator (user) desires to determine a distance to the target 218. The operator may provide such an input by operating the trigger 702 (engaging or releasing trigger 702), selecting a use mode (e.g., calibration, hunting, etc.) from a menu utilizing the user interface elements 700, or by initially powering the targeting system 102. In Step 1002, the processor instructs the projector 600 to project a laser sighting reticle 112 onto the target sighting window 108 and the light array 610 to output a fixed sighting element 110 onto the target sighting window 108. The laser sighting reticle 112 is presented on the target sighting window 108 and appears around the fixed sighting mark 110 (as discussed above) such that the operator can use both elements to ensure that the operator's line of sight 208 is aligned with the ranging module transmit axis 212 when target sighting window 108 is viewed from a perspective corresponding to eye position 202. The processor may additionally instruct the projector 600 to continue projecting the laser sighting reticle 112 for a certain duration. For example, the projector may continue projecting the laser sighting reticle 112 throughout the following steps, cease after the range indication has been received, cease after a certain time interval, cease upon a selection of a different mode by the operator, cease upon powering down the targeting system 102, or cease at another time.

In Step 1004, the processor presents a request to the operator to use the fixed sighting mark 110 and the laser sighting reticle 112 to align to the target 218. The processor also instructs the ranging module 500 to output a beam towards the target 218 and receive a reflection of the beam from 218. The processor may determine, or cause the ranging module 500 to determine, the distance from the bow 100 to the target 218. This may be performed upon an indication that the operator has aligned the fixed sighting mark 110 and the laser sighting reticle 112 to the target 218. It should be appreciated that the initial distance may be the above-discussed baseline distance. It should be appreciated that the line of sight 208 and the first compensated targeting axis 210 are generally aligned with a ranging module transmit axis 212 of the ranging module 500 when the fixed sighting mark 110 and the laser sighting reticle 112 to align to the target 218.

In Step 1006, the processor inquires of the operator whether the arrow 106 struck the target 218. This inquiry may be shown on the alphanumeric display 116, via an audible sound, via a secondary display (such as a smart phone or other external computing device, or directly on the target sighting window 108). The operator may then respond to the inquiry by various methods. For example, the operator may respond by selecting the appropriate user interface input 700, speaking an audible command, entering information on the secondary display, or by another input method.

If the operator provides an indication that the arrow 106 did not strike the target 218 to a sufficient accuracy, in Step 1008, the processor will present a request that the operator manually adjust the attachment arm 200 of the targeting system 102 so as to align the fixed sighting mark 110 and/or laser sighting reticle 112 with the correct targeting axis at the baseline distance. In some embodiments, the processor will present, to the operator via the alphanumeric display 116, an adjustment instruction for the operator to perform on an attachment arm 200 that is securing the targeting system 102 to the bow 100. The operator may input a relative impact location for the arrow 106 relative to the target 218 and the processor may calculate the appropriate adjustments to be made to orient bow 100 to strike target 218. For example, based upon the supplied information, the processor may control the display to present instructions that the operator should move the yaw adjustment two full rotations clockwise and move the azimuth adjustment one full rotation clockwise. Other embodiments of the attachment arm 200 may indicate to the user how far to slide the dovetail assembly in a particular direction to achieve the same yaw and azimuth adjustments. The processor may then receive, from the operator, an indication that the adjustment instruction has been performed. Upon the operator indicating that the adjustment is complete, the processor will then return to Step 1000 and begin the calibration process anew.

If the operator provides an indication that the arrow 106 did strike the target 218 to a sufficient accuracy, in Step 1010, the processor will present a request to the operator to move back by a predetermined distance. Alternatively, steps 1010-1024 may occur during use of the targeting system 102 after calibration. After acquiring, from the operator, a selection that the arrow 106 struck the target 218 at the first distance by aligning a fixed sighting mark 110 and the laser sighting reticle 112 presented on the target sighting window 108, the processor may determine additional user-defined sighting marks 900. The processor will do so by presenting, to the operator via the display, a request that the operator move to a first predetermined distance from the target 218. As discussed above with reference to FIG. 9, each predetermined distance may be of a fixed length (e.g., 10 yards or meters, 20 yards or 20 meters, etc.). The predetermined distance is used such that in future shooting scenarios, the processor can interpolate between, or extrapolate beyond, these user-defined sighting marks 900 to determine the variable sighting mark 114 for a wide range of distances.

In Step 1012, the processor acquires an indication that the operator would like to determine a distance, similarly as to Step 1000. This indication is typically associated with the operator moving back approximately back the interval distance. In Step 1014, the processor instructs the projector 600 to show the laser sighting reticle 112, such that the operator can know that the target 218 is being measured by the ranging module 500 (and not another object in the proximity or behind the target 218).

In Step 1016, the processor determines or acquires, from the ranging module 500, a distance to the target 218. In Step 1018, the processor determines a desired targeting orientation of the bow 100 (e.g., inclination, rotation, etc.) for the arrow 106 to strike the target 218. In Step 1020, the processor instructs the projector 600 to project, or the light array 610 to output onto the target sighting window 108, a variable sighting mark 114 on the target sighting window 108 that is indicative of the desired targeting orientation of the bow 100 to strike the target 218 based at least partially on the determined distance to the target 218. It should be appreciated that the variable sighting mark 114 will typically be below the fixed sighting mark 110 if the target is level to the operator and aligned vertically therewith (e.g., located along a vertical axis passing through the fixed sighting mark 110, not illustrated). In embodiments in which step 1016 occurs during use of the targeting system 102 after calibration, the variable sighting mark 114, the location of which is based at least partially on the determined distance to the target 218, is presented on the target sighting window 108 and is utilized by the user to strike target 218.

In Step 1022, the processor instructs the display to present another query to the operator, regarding whether the arrow 106 struck the target 218 using the afore-mentioned variable sighting mark 114. The operator will then provide a response, such as discussed above. If the operator provides an indication that the arrow 106 did not strike the target 218 to a sufficient accuracy, in Step 1024, the processor may present another query to the operator as to the miss magnitude and direction (e.g., upward or downward from the target 218). The magnitude and direction of the miss may be entered by the operator using the user interface elements 700 located atop the alphanumeric display 116, or via another method (such as entry into a wirelessly connected electronic device such as a smart phone).

If the operator provides an indication that the arrow 106 did strike the target 218 to a sufficient accuracy, in Step 1026, the processor will present an additional inquiry to the operator regarding whether the operator desires to set additional user-defined sighting marks 900. Upon acquiring, from the operator, an indication that the arrow 106 struck the target 218 at the second distance by aligning the variable sighting mark 114 of the target sighting window 108, the variable sighting mark 114 associated with that distance will be used as a future reference point both by the processor (in determining the appropriate compensated sighting mark for future calculations) and/or by the operator (in viewing the variable sighting mark 114 in relation to the user-defined sighting mark, as illustrated in FIG. 9). The processor will therefore save the variable sighting mark 114 (or information related thereto) as a first user-defined sighting mark associated with the second compensated targeting axis 210 and the second distance.

If the operator indicates, in response to the inquiry, that additional user-defined sighting marks 900 are desired, the processor will return to Step 1010 such that another user-defined sighting mark can be saved. In this manner, multiple user-defined sighting marks 900 can be determined and saved. Based upon at least two user-defined sighting marks 900, the processor may be able to determine certain characteristics of the bow 100 and the arrow 106, such as exit speed, arrow weight, arrow drag, and other characteristics. These known characteristics may be used by the processor in determining the compensated targeting axis 210 for the future user-defined sighting marks 900 and variable sighting marks 114. As such, the determinations may become more accurate through the iteration of cycles of the above-discussed steps.

It should be appreciated that in repeating the steps, the processor may present, to the operator via the display, a request that the operator move to a second interval from the target 218. The processor may then determine, from the ranging module 500, a third distance indication of a third distance to the target 218. The processor may then determine a third desired targeting inclination for the arrow 106 to strike the target 218 at the third distance, and instruct the projector 600 to project the variable sighting mark 114 on the target sighting window 108 that is indicative of the third desired targeting inclination. Upon an indication from the operator that the arrow 106 struck the target 218 at the third distance by aligning the variable sighting mark 114 of the target sighting window 108, associated with the third desired targeting inclination, the processor will save the variable sighting mark 114 as a second user-defined sighting mark associated with the second-profile compensated targeting axis and the second distance. The processor will also save the second user-defined sighting mark to the first user profile.

If the operator indicates, in response to the inquiry, that additional user-defined sighting marks 900 are not desired, the processor will move to Step 1028. In Step 1028, the processor saves said first user-defined sighting mark (and any other determined user-defined sighting marks 900) to a first user profile for the operator. The first user profile includes the user-defined sighting marks 900 and other information.

In some embodiments, the processor may receive, from the operator, an indication that the operator has changed an arrow 106 parameter. Arrow 106 parameters affect the flight characteristics of the arrow 106, such that changing a parameter will (to some extent) the user-defined sighting marks 900 are no longer accurate for future firings. The parameter may be changing a bow setting, changing to a second arrow 106 that is different than another arrow 106, changing the bow 100, changing to a second operator, or other changes. Changing a parameter may be appropriate for various reasons. The changing of the parameter may occur at the end of the calibration process, so as to perform a second calibration that is stored in the memory of the targeting system 102. For example, this may be done if two different types of arrows are likely to be used in the future. The operator will perform two calibrations, one with each type of arrow, and save a user profile respective to each. Separate of the calibration process, processor may present, to the operator via the display, an option to select either the first user profile or the second user profile based upon the parameter being utilized.

The processor may also instruct the projector 600 to project the first user-defined sighting mark 900 and the second user-defined sighting mark 900 on the target sighting window 108. The processor may then instruct the projector 600 to project the variable sighting mark 114 on the target sighting window 108 between the first user-defined sighting mark 900 and the second user-defined sighting mark 900, such as illustrated in FIG. 9. The variable sighting mark 114 is therefore indicative that the distance to the target 218 is between the second distance and the third distance.

Generally, any of the functions described herein may be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the targeting system 102 may be wired, wireless, or some combination thereof. In the case of a software implementation, for instance, the module represents executable instructions that perform specified tasks when executed on a processor. The program code may be stored in one or more device-readable storage media, an example of which is the memory of the targeting system 102.

FIG. 11 shows an exemplary targeting system 102 electrical block diagram. It should be appreciated that, like other figures discussed herein, the block diagram is only exemplary to aid in the understanding by the reader. The targeting system 102 includes a processor 1100 (which may be itself, or may be associated with the above-discussed processor) supporting a mix of serial buses and programmable logic standards. Both the light array 610 and the projector engine 616 are driven by current-controlled LED driver 1102 under the control of general purpose IO's and PWM outputs for brightness control. A trans-reflective LCD display 1106 (associated with the alphanumeric display 116) may contain a sub-processor to reduce main processor 1100 loading and communications requirements. An ambient light sensor 1108 measures the light levels of the target scene to allow adaptive brightness control of the targeting LEDs and the activation of the display backlight under darker conditions, as discussed above. The ranging module 1110 includes a laser driver 1112, single mode or pulsed laser diode 1114 (all associated with the beam source 508 discussed above) as well as a receiver 1116 (associated with the beam receptor 512). In embodiments, a portion of processor 1100 and a memory of the targeting system 102 may be located within ranging module 1110.

Processor 1100 may determine a range (distance) to a target based on a calculated delay between a transmission of a coded burst code and the reception of a reflected transmission and subsequent correlation of the received signal against a stored transmit signature corresponding to the transmitted signal. The laser diode 1114 offers a precise measurement beam with a divergence under a minimum threshold (for example, under 1 milli-radian). Bias supply 1118 provides a regulated high voltage output controlled by the microcontroller 1100 based on inputs of the system noise floor as measured by the processor 1110 and a temperature sensor. Solid-state gyro 1120 (being the above-discussed inclinometer) provides bow inclination information, which is used to calculate the required elevation offset based on calculations for arrow drop when combined with target range. Accelerometer 1122 is used to monitor bow rotational dynamics during a shot which can be used to detect incorrect firing technique of the operator, and to detect release of arrow 106. Magnetometer 1124 performs functions as a digital compass, in conjunction with the gyro 1120 and the measured distance from the ranging module 500 can provide heading, distance and inclination to a target 218. This information, when combined with the capability to transmit the data to a GPS-enabled smart phone using communication element 1126 operating using any of various wireless standards (such as BLUETOOTH or the low-power ANT wireless standard). The communication element also allows the logging or forwarding of the location of the target 218 to an external system (for example, to mark the target location on a map for later inspection by the operator). Serial flash 1128 can be used to store user programmed parameters, software downloads and the storage of a history of operation for later review.

Although systems and methods for targeting displays have been disclosed in terms of specific structural features and acts, it is to be understood that the appended claims are not to be limited to the specific features and acts described. Rather, the specific features and acts are disclosed as exemplary forms of implementing the claimed devices and techniques and it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A targeting system operable to be used with a bow to assist an operator with striking a target with an arrow from the bow, the targeting system comprising:
   a target sighting window that is substantially transparent;
   a projector;
   a ranging module operable to output a beam towards the target and receive a reflection of the beam from the target;

a memory; and a processor coupled with the ranging module, the projector and the memory, the processor configured to:

control the projector to project a first sighting element and a second sighting element onto the target sighting window such that one of the sighting elements appears closer to the target than the other sighting element from a perspective corresponding to an eye position, the first sighting element being a laser sighting reticle aligned to the beam and the second sighting element being a fixed sighting mark, the first and second sighting elements corresponding to a selected target that the operator desires to strike with the arrow, determine a range to the selected target based on the reflected beam, determine an orientation of the bow based at least partially on the determined range to the selected target, determine a location on the target sighting window to present a variable compensated sighting mark corresponding to the determined orientation, and control the projector to present the variable compensated sighting mark on the target sighting window.

2. The targeting system of claim 1, wherein the determined orientation of the bow corresponding to the variable compensated sighting mark is associated with a change in vertical tilt or a lateral rotation of the bow.

3. The targeting system of claim 1, wherein the processor identifies one of a plurality of vertically-aligned light emitting diodes within the projector to be illuminated to present the variable compensated sighting mark on the target sighting window.

4. The targeting system of claim 1, wherein the memory includes a location on the target sighting window at which to project the laser sighting reticle.

5. The targeting system of claim 1, wherein the first sighting element and the second sighting element are presented within an alignment region of the target sighting window.

6. The targeting system of claim 1, wherein the beam output by the ranging module travels along a ranging module transmit axis, and wherein a line of sight coincides with the ranging module transmit axis when the laser sighting reticle and fixed sighting mark align from a perspective corresponding to an eye position.

7. The targeting system of claim 1, wherein the target sighting window comprises a window disposed diagonally to the ranging module transmit axis, and wherein the variable compensated sighting mark is projected on the window that is disposed diagonally to the ranging module transmit axis, wherein the laser sighting reticle appears closer to the target than the fixed sighting mark from a perspective corresponding to an eye position.

8. The targeting system of claim 1, wherein the projector includes a light array operable to present the variable compensated sighting mark and the fixed sighting mark on the target sighting window.

9. The targeting system of claim 1, wherein the processor is further configured to control the projector to project a plurality of alignment guidance marks indicating a direction in which the targeting system must be oriented to align the first sighting element and the second sighting element from a perspective corresponding to an eye position.

10. The target system of claim 1, wherein the projector includes a projector engine operable to project the first sighting element onto the target sighting window and a light array operable to present the variable compensated sighting mark on the target sighting window.

11. The targeting system of claim 1, wherein the projector includes a light array including a set of light emitting diodes presented on the target sighting window, and wherein the light array is operable to present any of at least thirty sighting marks on the target sighting window.

12. The targeting system of claim 11, wherein the projector is operable to present a set of user-defined sighting marks, wherein each user-defined sighting mark in the set of user-defined sighting marks is associated with a known targeting axis at a certain targeting distance.

13. The targeting system of claim 12, wherein the variable compensated sighting mark further includes a target-specific sighting mark disposed between two user-defined sighting marks of the set of user defined sighting marks.

14. The targeting system of claim 1, further comprising a memory storing a velocity of an arrow, and wherein the processor is further to determine the orientation of the bow based on the velocity of an arrow.

15. A targeting system operable to be used with a bow to assist an operator with striking a target with an arrow from the bow, the targeting system comprising:

a target sighting window that is substantially transparent;

a projector operable to project information onto the target sighting window;

a ranging module operable to output a beam towards the target and receive a reflection of the beam from the target;

a memory including a first location on the target sighting window at which to project a first sighting element; and a processor coupled with the ranging module, the projector and the memory, the processor configured to:

control the projector to project the first sighting element at the first location and a second sighting element onto the target sighting window such that one of the sighting elements appears closer to the target than the other sighting element from a perspective corresponding to an eye position, the first sighting element being a laser sighting reticle aligned to the beam and the second sighting element being a fixed sighting mark, the first and second sighting elements corresponding to a selected for selecting the target that the operator desires to strike with the arrow, determine a range to the selected target based on the reflected beam, determine an orientation of the bow based at least partially on the determined range to the selected target, determine a second location on the target sighting window to present a variable compensated sighting mark corresponding to the determined orientation, and control the projector to present the variable compensated sighting mark at the second location on the target sighting window.

16. The targeting system of claim 15, wherein the first sighting element appears closer to the target than the second sighting element from a perspective corresponding to an eye position.

17. The targeting system of claim 16, wherein the laser sighting reticle appears closer to the target than the fixed sighting mark from a perspective corresponding to an eye position.

18. The targeting system of claim 16, wherein the laser sighting reticle and the fixed sighting mark are presented within an alignment region of the target sighting window, and wherein the processor is further configured to control the projector to project a plurality of alignment guidance marks indicating a direction in which the targeting system must be oriented to align the laser sighting reticle and the fixed sighting mark from a perspective corresponding to an eye position.

19. The targeting system of claim 15, wherein the determined orientation of the bow corresponding to the variable compensated sighting mark is associated with a change in vertical tilt or a lateral rotation of the bow.

20. The targeting system of claim 15, wherein the first sighting element and the second sighting element are presented within an alignment region of the target sighting window, and wherein the processor is further configured to control the projector to project a plurality of alignment guidance marks indicating a direction in which the targeting system must be oriented to align the first sighting element and the second sighting element from a perspective corresponding to an eye position.

21. The targeting system of claim 15, wherein the beam output by the ranging module travels along a ranging module transmit axis, and wherein a line of sight coincides with the ranging module transmit axis when the laser sighting reticle and fixed sighting mark align from a perspective corresponding to an eye position.

22. The targeting system of claim 15, wherein the projector includes a projector engine operable to project the first sighting element onto the target sighting window and a light array operable to present the variable compensated sighting mark and the fixed sighting mark on the target sighting window.

23. A targeting system operable to be used with a bow to assist an operator with striking a target with an arrow from the bow, the targeting system comprising:

a target sighting window that is substantially transparent;

a projector operable to project information onto the target sighting window;

a ranging module operable to output a beam towards the target and receive a reflection of the beam from the target;

a memory including a first location on the target sighting window at which to project a laser sighting reticle; and a processor coupled with the ranging module, the projector and the memory, the processor configured to:

control the projector to project the laser sighting reticle at the first location and a fixed sighting mark onto the target sighting window such that the laser sighting reticle appears closer to the target than the fixed sighting mark from a perspective corresponding to an eye position, the laser sighting reticle aligned to the beam and corresponding to a selected target that the operator desires to strike with the arrow, determine a range to the selected target based on the reflected beam, determine an orientation of the bow based at least partially on the determined range to the selected target, the orientation corresponding to a change in vertical tilt or a lateral rotation of the bow, determine a second location on the target sighting window to present a variable compensated sighting mark corresponding to the determined orientation, and control the projector to present the variable compensated sighting mark at the second location on the target sighting window.

\* \* \* \* \*